United States Patent [19]
Shimatani

[11] Patent Number: 5,396,607
[45] Date of Patent: Mar. 7, 1995

[54] MATRIX ADDRESS GENERATOR AND MULTIVALUE GRADATION PROCESSOR HAVING THE SAME

[75] Inventor: Akira Shimatani, Sakai, Japan

[73] Assignee: Mita Industrial Co., Ltd., Osaka, Japan

[21] Appl. No.: 848,207

[22] Filed: Mar. 10, 1992

[30] Foreign Application Priority Data

Mar. 12, 1991 [JP] Japan .................. 3-073843

[51] Int. Cl.⁶ .............. G06F 12/00; G06F 15/64; H04N 1/40; H04N 1/23
[52] U.S. Cl. .................. 395/400; 395/137; 395/164; 395/166; 345/190; 345/200; 358/456; 358/458; 358/460
[58] Field of Search .......... 395/400, 164, 166, 137; 345/190, 200; 358/456, 458, 460, 457, 429

[56] References Cited

U.S. PATENT DOCUMENTS

| | | | |
|---|---|---|---|
| 4,185,304 | 1/1980 | Holladay | 358/459 X |
| 4,400,738 | 8/1983 | Tomory et al. | 358/456 |
| 4,507,685 | 3/1985 | Kawamura | 358/536 |
| 4,533,941 | 8/1985 | Keane et al. | 358/534 |
| 4,556,918 | 12/1985 | Yamazaki et al. | 358/456 |
| 4,692,879 | 9/1987 | Ikuta | 395/115 |
| 4,700,235 | 10/1987 | Gall | 358/459 |
| 4,701,806 | 10/1987 | Takashima | 358/457 |
| 4,745,466 | 5/1988 | Yoshida et al. | 358/517 |
| 4,752,822 | 6/1988 | Kawamura | 358/457 |
| 4,758,897 | 7/1988 | Hiratsuka et al. | 358/457 |
| 4,918,622 | 4/1990 | Granger et al. | 395/132 |
| 4,965,744 | 10/1990 | Wagatsuma et al. | 395/109 |
| 4,977,458 | 12/1990 | Granger et al. | 358/456 |
| 4,987,498 | 1/1991 | Shimazaki | 358/456 |
| 5,019,896 | 5/1991 | Shimazaki | 358/456 X |
| 5,029,017 | 7/1991 | Abe et al. | 358/451 |
| 5,101,283 | 3/1992 | Seki et al. | 358/456 |
| 5,150,428 | 9/1992 | Leone et al. | 358/455 |
| 5,166,809 | 11/1992 | Surbrook | 358/456 |
| 5,175,635 | 12/1992 | Yamada et al. | 358/467 |
| 5,241,626 | 8/1993 | Taoda | 395/137 |
| 5,274,473 | 12/1993 | Kidd et al. | 358/460 |

FOREIGN PATENT DOCUMENTS

| | | |
|---|---|---|
| 141869 | 5/1985 | European Pat. Off. . |
| 2397112 | 2/1979 | France . |
| 2155728 | 9/1985 | United Kingdom . |

Primary Examiner—Jack B. Harvey
Assistant Examiner—Michael A. Whitfield
Attorney, Agent, or Firm—Beveridge, DeGrandi, Weilacher & Young

[57] ABSTRACT

The present invention provides a matrix address generator for generating horizontal and vertical addresses in various patterns in the case where a memory table matrix provided in gradation data storage means is specified by the horizontal and vertical addresses. The matrix address generator comprises a dot counting portion, a line counting portion, an address exchanging portion, a boundary exchanging portion, matrix boundary counting portions, and adding portions. Addresses counted by the dot counting portion are exchanged by the address exchanging portion if necessary. The addresses and adding addresses counted by the matrix boundary counting portion are added together so that addresses having various patterns can be obtained.

22 Claims, 26 Drawing Sheets

| ADDRESS | MEMORY TABLE |
|---|---|
| 0 0 0 0 | MT 0 0 |
| 0 0 0 1 | MT 0 1 |
| 0 1 0 0 | MT 1 0 |
| 0 1 0 1 | MT 1 1 |

FIG. 4

| INPUT | OUTPUT | | | |
|---|---|---|---|---|
| ADDRESS | MT00 | MT01 | MT10 | MT11 |
| 0 0 0 | 0 0 | 0 0 | 0 0 | 0 0 |
| 0 0 1 | 1 0 | 0 0 | 0 0 | 0 0 |
| 0 1 0 | 1 0 | 1 0 | 0 0 | 0 0 |
| 0 1 1 | 1 0 | 1 0 | 1 0 | 0 0 |
| 1 0 0 | 1 0 | 1 0 | 1 0 | 1 0 |
| 1 0 1 | 1 1 | 1 0 | 1 0 | 1 0 |
| 1 1 0 | 1 1 | 1 1 | 1 0 | 1 0 |
| 1 1 1 | 1 1 | 1 1 | 1 1 | 1 0 |

FIG. 5

X DIRECTION ADDRESS

| | | 0 | 1 | 2 | 3 |
|---|---|---|---|---|---|
| | 0 | MT00 | MT01 | MT02 | MT03 |
| | 1 | MT10 | MT11 | MT12 | MT13 |
| Y DIRECTION | 2 | MT20 | MT21 | MT22 | MT23 |
| ADDRESS | 3 | MT30 | MT31 | MT32 | MT33 |

FIG. 6

| TABLE ADDRESS | |
|---|---|
| 0 0   0 0 | MT 0 0 |
| 0 0   0 1 | MT 0 1 |
| 0 0   1 0 | MT 0 2 |
| 0 0   1 1 | MT 0 3 |
| 0 1   0 0 | MT 1 0 |
| 0 1   0 1 | MT 1 1 |
| 0 1   1 0 | MT 1 2 |
| 0 1   1 1 | MT 1 3 |
| 1 0   0 0 | MT 2 0 |
| 1 0   0 1 | MT 2 1 |
| 1 0   1 0 | MT 2 2 |
| 1 0   1 1 | MT 2 3 |
| 1 1   0 0 | MT 3 0 |
| 1 1   0 1 | MT 3 1 |
| 1 1   1 0 | MT 3 2 |
| 1 1   1 1 | MT 3 3 |

[ BINARY REPRESENTATION ]

FIG. 7
(A) 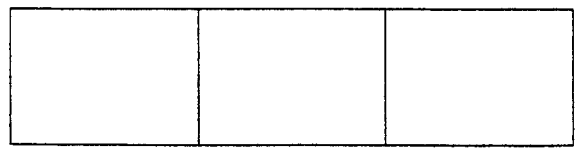
(B) 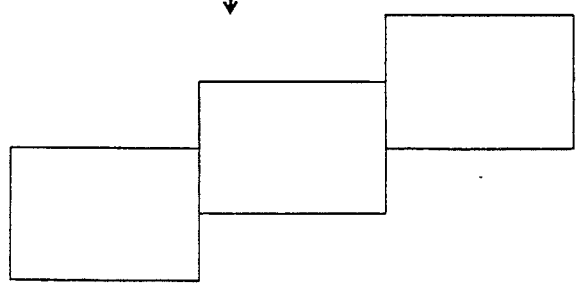
FIG. 8
(A)          (B)
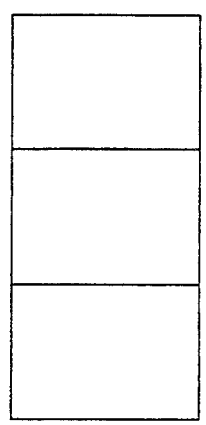  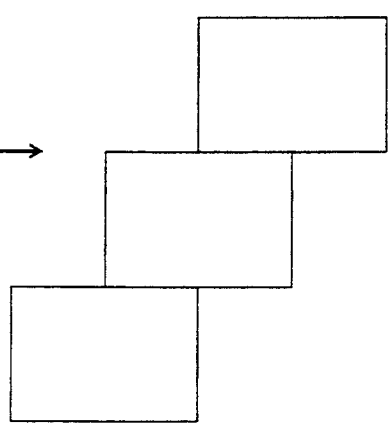

FIG. 12

NORMAL STATE
EXCHANGE: 0,   X_U/D: 0,   Y_U/D: 0
X_SIZE: 3,     X_START: 0, X_SHIFT: 0
Y_SIZE: 3,     Y_START: 0, Y_SHIFT: 0

MAIN SCANNING DIRECTION ⟶

SUBSCANNING DIRECTION ↓

| 00 | 01 | 02 | 03 | 00 | 01 | 02 | 03 | 00 | 01 | 02 | 03 | 00 | 01 | 02 | 03 |
|----|----|----|----|----|----|----|----|----|----|----|----|----|----|----|----|
| 10 | 11 | 12 | 13 | 10 | 11 | 12 | 13 | 10 | 11 | 12 | 13 | 10 | 11 | 12 | 13 |
| 20 | 21 | 22 | 23 | 20 | 21 | 22 | 23 | 20 | 21 | 22 | 23 | 20 | 21 | 22 | 23 |
| 30 | 31 | 32 | 33 | 30 | 31 | 32 | 33 | 30 | 31 | 32 | 33 | 30 | 31 | 32 | 33 |
| 00 | 01 | 02 | 03 | 00 | 01 | 02 | 03 | 00 | 01 | 02 | 03 | 00 | 01 | 02 | 03 |
| 10 | 11 | 12 | 13 | 10 | 11 | 12 | 13 | 10 | 11 | 12 | 13 | 10 | 11 | 12 | 13 |
| 20 | 21 | 22 | 23 | 20 | 21 | 22 | 23 | 20 | 21 | 22 | 23 | 20 | 21 | 22 | 23 |
| 30 | 31 | 32 | 33 | 30 | 31 | 32 | 33 | 30 | 31 | 32 | 33 | 30 | 31 | 32 | 33 |

FIG. 13

90° ROTATION
EXCHANGE: 1,   X_U/D: 0,   Y_U/D: 1
X_SIZE: 3,     X_START: 0, X_SHIFT: 0
Y_SIZE: 3,     Y_START: 0, Y_SHIFT: 0

| 03 | 13 | 23 | 33 | 03 | 13 | 23 | 33 | 03 | 13 | 23 | 33 | 03 | 13 | 23 | 33 |
|----|----|----|----|----|----|----|----|----|----|----|----|----|----|----|----|
| 02 | 12 | 22 | 32 | 02 | 12 | 22 | 32 | 02 | 12 | 22 | 32 | 02 | 12 | 22 | 32 |
| 01 | 11 | 21 | 31 | 01 | 11 | 21 | 31 | 01 | 11 | 21 | 31 | 01 | 11 | 21 | 31 |
| 00 | 10 | 20 | 30 | 00 | 10 | 20 | 30 | 00 | 10 | 20 | 30 | 00 | 10 | 20 | 30 |
| 03 | 13 | 23 | 33 | 03 | 13 | 23 | 33 | 03 | 13 | 23 | 33 | 03 | 13 | 23 | 33 |
| 02 | 12 | 22 | 32 | 02 | 12 | 22 | 32 | 02 | 12 | 22 | 32 | 02 | 12 | 22 | 32 |
| 01 | 11 | 21 | 31 | 01 | 11 | 21 | 31 | 01 | 11 | 21 | 31 | 01 | 11 | 21 | 31 |
| 00 | 10 | 20 | 30 | 00 | 10 | 20 | 30 | 00 | 10 | 20 | 30 | 00 | 10 | 20 | 30 |

FIG. 14

180° ROTATION

EXCHANGE: 0,    X_Ū/D: 1,    Y_Ū/D: 1
X_SIZE: 3,      X_START: 0,  X_SHIFT: 0
Y_SIZE: 3,      Y_START: 0,  Y_SHIFT: 0

| 33 | 32 | 31 | 30 | 33 | 32 | 31 | 30 | 33 | 32 | 31 | 30 | 33 | 32 | 31 | 30 |
|----|----|----|----|----|----|----|----|----|----|----|----|----|----|----|----|
| 23 | 22 | 21 | 20 | 23 | 22 | 21 | 20 | 23 | 22 | 21 | 20 | 23 | 22 | 21 | 20 |
| 13 | 12 | 11 | 10 | 13 | 12 | 11 | 10 | 13 | 12 | 11 | 10 | 13 | 12 | 11 | 10 |
| 03 | 02 | 01 | 00 | 03 | 02 | 01 | 00 | 03 | 02 | 01 | 00 | 03 | 02 | 01 | 00 |
| 33 | 32 | 31 | 30 | 33 | 32 | 31 | 30 | 33 | 32 | 31 | 30 | 33 | 32 | 31 | 30 |
| 23 | 22 | 21 | 20 | 23 | 22 | 21 | 20 | 23 | 22 | 21 | 20 | 23 | 22 | 21 | 20 |
| 13 | 12 | 11 | 10 | 13 | 12 | 11 | 10 | 13 | 12 | 11 | 10 | 13 | 12 | 11 | 10 |
| 03 | 02 | 01 | 00 | 03 | 02 | 01 | 00 | 03 | 02 | 01 | 00 | 03 | 02 | 01 | 00 |

FIG. 15

270° ROTATION

EXCHANGE: 1,    X_Ū/D: 1,    Y_Ū/D: 0
X_SIZE: 3,      X_START: 0,  X_SHIFT: 0
Y_SIZE: 3,      Y_START: 0,  Y_SHIFT: 0

| 30 | 20 | 10 | 00 | 30 | 20 | 10 | 00 | 30 | 20 | 10 | 00 | 30 | 20 | 10 | 00 |
|----|----|----|----|----|----|----|----|----|----|----|----|----|----|----|----|
| 31 | 21 | 11 | 01 | 31 | 21 | 11 | 01 | 31 | 21 | 11 | 01 | 31 | 21 | 11 | 01 |
| 32 | 22 | 12 | 02 | 32 | 22 | 12 | 02 | 32 | 22 | 12 | 02 | 32 | 22 | 12 | 02 |
| 33 | 23 | 13 | 03 | 33 | 23 | 13 | 03 | 33 | 23 | 13 | 03 | 33 | 23 | 13 | 03 |
| 30 | 20 | 10 | 00 | 30 | 20 | 10 | 00 | 30 | 20 | 10 | 00 | 30 | 20 | 10 | 00 |
| 31 | 21 | 11 | 01 | 31 | 21 | 11 | 01 | 31 | 21 | 11 | 01 | 31 | 21 | 11 | 01 |
| 32 | 22 | 12 | 02 | 32 | 22 | 12 | 02 | 32 | 22 | 12 | 02 | 32 | 22 | 12 | 02 |
| 33 | 23 | 13 | 03 | 33 | 23 | 13 | 03 | 33 | 23 | 13 | 03 | 33 | 23 | 13 | 03 |

FIG. 16

SHIFT BY 1 PIXEL IN A MAIN SCANNING DIRECTION
BETWEEN MATRICES IN A SUBSCANNING DIRECTION

EXCHANGE: 0,    X_$\overline{U}$/D: 0,    Y_$\overline{U}$/D: 0
X_SIZE: 3,      X_START: 0,    X_SHIFT: 1
Y_SIZE: 3,      Y_START: 0,    Y_SHIFT: 0

| 00 | 01 | 02 | 03 | 00 | 01 | 02 | 03 | 00 | 01 | 02 | 03 | 00 | 01 | 02 | 03 |
|----|----|----|----|----|----|----|----|----|----|----|----|----|----|----|----|
| 10 | 11 | 12 | 13 | 10 | 11 | 12 | 13 | 10 | 11 | 12 | 13 | 10 | 11 | 12 | 13 |
| 20 | 21 | 22 | 23 | 20 | 21 | 22 | 23 | 20 | 21 | 22 | 23 | 20 | 21 | 22 | 23 |
| 30 | 31 | 32 | 33 | 30 | 31 | 32 | 33 | 30 | 31 | 32 | 33 | 30 | 31 | 32 | 33 |
| 01 | 02 | 03 | 00 | 01 | 02 | 03 | 00 | 01 | 02 | 03 | 00 | 01 | 02 | 03 | 00 |
| 11 | 12 | 13 | 10 | 11 | 12 | 13 | 10 | 11 | 12 | 13 | 10 | 11 | 12 | 13 | 10 |
| 21 | 22 | 23 | 20 | 21 | 22 | 23 | 20 | 21 | 22 | 23 | 20 | 21 | 22 | 23 | 20 |
| 31 | 32 | 33 | 30 | 31 | 32 | 33 | 30 | 31 | 32 | 33 | 30 | 31 | 32 | 33 | 30 |
| 02 | 03 | 00 | 01 | 02 | 03 | 00 | 01 | 02 | 03 | 00 | 01 | 02 | 03 | 00 | 01 |

FIG. 17

SHIFT BY 2 PIXELS IN A MAIN SCANNING DIRECTION
BETWEEN MATRICES IN A SUBSCANNING DIRECTION

EXCHANGE: 0,    X_$\overline{U}$/D: 0,    Y_$\overline{U}$/D: 0
X_SIZE: 3,      X_START: 0,    X_SHIFT: 2
Y_SIZE: 3,      Y_START: 0,    Y_SHIFT: 0

| 00 | 01 | 02 | 03 | 00 | 01 | 02 | 03 | 00 | 01 | 02 | 03 | 00 | 01 | 02 | 03 |
|----|----|----|----|----|----|----|----|----|----|----|----|----|----|----|----|
| 10 | 11 | 12 | 13 | 10 | 11 | 12 | 13 | 10 | 11 | 12 | 13 | 10 | 11 | 12 | 13 |
| 20 | 21 | 22 | 23 | 20 | 21 | 22 | 23 | 20 | 21 | 22 | 23 | 20 | 21 | 22 | 23 |
| 30 | 31 | 32 | 33 | 30 | 31 | 32 | 33 | 30 | 31 | 32 | 33 | 30 | 31 | 32 | 33 |
| 02 | 03 | 00 | 01 | 02 | 03 | 00 | 01 | 02 | 03 | 00 | 01 | 02 | 03 | 00 | 01 |
| 12 | 13 | 10 | 11 | 12 | 13 | 10 | 11 | 12 | 13 | 10 | 11 | 12 | 13 | 10 | 11 |
| 22 | 23 | 20 | 21 | 22 | 23 | 20 | 21 | 22 | 23 | 20 | 21 | 22 | 23 | 20 | 21 |
| 32 | 33 | 30 | 31 | 32 | 33 | 30 | 31 | 32 | 33 | 30 | 31 | 32 | 33 | 30 | 31 |
| 00 | 01 | 02 | 03 | 00 | 01 | 02 | 03 | 00 | 01 | 02 | 03 | 00 | 01 | 02 | 03 |

FIG. 18

SHIFT BY 3 PIXELS IN A MAIN SCANNING DIRECTION
  BETWEEN MATRICES IN A SUBSCANNING DIRECTION

EXCHANGE: 0,   X_U̅/D: 0,    Y_U̅/D: 0
X_SIZE: 3,     X_START: 0,   X_SHIFT: 3
Y_SIZE: 3,     Y_START: 0,   Y_SHIFT: 0

| 00 | 01 | 02 | 03 | 00 | 01 | 02 | 03 | 00 | 01 | 02 | 03 | 00 | 01 | 02 | 03 |
|----|----|----|----|----|----|----|----|----|----|----|----|----|----|----|----|
| 10 | 11 | 12 | 13 | 10 | 11 | 12 | 13 | 10 | 11 | 12 | 13 | 10 | 11 | 12 | 13 |
| 20 | 21 | 22 | 23 | 20 | 21 | 22 | 23 | 20 | 21 | 22 | 23 | 20 | 21 | 22 | 23 |
| 30 | 31 | 32 | 33 | 30 | 31 | 32 | 33 | 30 | 31 | 32 | 33 | 30 | 31 | 32 | 33 |
| 03 | 00 | 01 | 02 | 03 | 00 | 01 | 02 | 03 | 00 | 01 | 02 | 03 | 00 | 01 | 02 |
| 13 | 10 | 11 | 12 | 13 | 10 | 11 | 12 | 13 | 10 | 11 | 12 | 13 | 10 | 11 | 12 |
| 23 | 20 | 21 | 22 | 23 | 20 | 21 | 22 | 23 | 20 | 21 | 22 | 23 | 20 | 21 | 22 |
| 33 | 30 | 31 | 32 | 33 | 30 | 31 | 32 | 33 | 30 | 31 | 32 | 33 | 30 | 31 | 32 |
| 02 | 03 | 00 | 01 | 02 | 03 | 00 | 01 | 02 | 03 | 00 | 01 | 02 | 03 | 00 | 01 |

FIG. 19

SHIFT BY 1 PIXEL IN A SUBSCANNING DIRECTION
  BETWEEN MATRICES IN A MAIN SCANNING DIRECTION

EXCHANGE: 0,   X_U̅/D: 0,    Y_U̅/D: 0
X_SIZE: 3,     X_START: 0,   X_SHIFT: 0
Y_SIZE: 3,     Y_START: 0,   Y_SHIFT: 1

| 00 | 01 | 02 | 03 | 10 | 11 | 12 | 13 | 20 | 21 | 22 | 23 | 30 | 31 | 32 | 33 |
|----|----|----|----|----|----|----|----|----|----|----|----|----|----|----|----|
| 10 | 11 | 12 | 13 | 20 | 21 | 22 | 23 | 30 | 31 | 32 | 33 | 00 | 01 | 02 | 03 |
| 20 | 21 | 22 | 23 | 30 | 31 | 32 | 33 | 00 | 01 | 02 | 03 | 10 | 11 | 12 | 13 |
| 30 | 31 | 32 | 33 | 00 | 01 | 02 | 03 | 10 | 11 | 12 | 13 | 20 | 21 | 22 | 23 |
| 00 | 01 | 02 | 03 | 10 | 11 | 12 | 13 | 20 | 21 | 22 | 23 | 30 | 31 | 32 | 33 |
| 10 | 11 | 12 | 13 | 20 | 21 | 22 | 23 | 30 | 31 | 32 | 33 | 00 | 01 | 02 | 03 |
| 20 | 21 | 22 | 23 | 30 | 31 | 32 | 33 | 00 | 01 | 02 | 03 | 10 | 11 | 12 | 13 |
| 30 | 31 | 32 | 33 | 00 | 01 | 02 | 03 | 10 | 11 | 12 | 13 | 20 | 21 | 22 | 23 |
| 00 | 01 | 02 | 03 | 10 | 11 | 12 | 13 | 20 | 21 | 22 | 23 | 30 | 31 | 32 | 33 |

FIG. 20

SHIFT BY 2 PIXELS IN A SUBSCANNING DIRECTION
BETWEEN MATRICES IN A MAIN SCANNING DIRECTION

EXCHANGE: 0,   X_U/D: 0,      Y_U/D: 0
X_SIZE: 3,     X_START: 0,    X_SHIFT: 0
Y_SIZE: 3,     Y_START: 0,    Y_SHIFT: 2

| 00 | 01 | 02 | 03 | 20 | 21 | 22 | 23 | 00 | 01 | 02 | 03 | 20 | 21 | 22 | 23 |
|----|----|----|----|----|----|----|----|----|----|----|----|----|----|----|----|
| 10 | 11 | 12 | 13 | 30 | 31 | 32 | 33 | 10 | 11 | 12 | 13 | 30 | 31 | 32 | 33 |
| 20 | 21 | 22 | 23 | 00 | 01 | 02 | 03 | 20 | 21 | 22 | 23 | 00 | 01 | 02 | 03 |
| 30 | 31 | 32 | 33 | 10 | 11 | 12 | 13 | 30 | 31 | 32 | 33 | 10 | 11 | 12 | 13 |
| 00 | 01 | 02 | 03 | 20 | 21 | 22 | 23 | 00 | 01 | 02 | 03 | 20 | 21 | 22 | 23 |
| 10 | 11 | 12 | 13 | 30 | 31 | 32 | 33 | 10 | 11 | 12 | 13 | 30 | 31 | 32 | 33 |
| 20 | 21 | 22 | 23 | 00 | 01 | 02 | 03 | 20 | 21 | 22 | 23 | 00 | 01 | 02 | 03 |
| 30 | 31 | 32 | 33 | 10 | 11 | 12 | 13 | 30 | 31 | 32 | 33 | 10 | 11 | 12 | 13 |
| 00 | 01 | 02 | 03 | 20 | 21 | 22 | 23 | 00 | 01 | 02 | 03 | 20 | 21 | 22 | 23 |

FIG. 21

SHIFT BY 3 PIXELS IN A SUBSCANNING DIRECTION
BETWEEN MATRICES IN A MAIN SCANNING DIRECTION

EXCHANGE: 0,   X_U/D: 0,      Y_U/D: 0
X_SIZE: 3,     X_START: 0,    X_SHIFT: 0
Y_SIZE: 3,     Y_START: 0,    Y_SHIFT: 3

| 00 | 01 | 02 | 03 | 30 | 31 | 32 | 33 | 20 | 21 | 22 | 23 | 10 | 11 | 12 | 13 |
|----|----|----|----|----|----|----|----|----|----|----|----|----|----|----|----|
| 10 | 11 | 12 | 13 | 00 | 01 | 02 | 03 | 30 | 31 | 32 | 33 | 20 | 21 | 22 | 23 |
| 20 | 21 | 22 | 23 | 10 | 11 | 12 | 13 | 00 | 01 | 02 | 03 | 30 | 31 | 32 | 33 |
| 30 | 31 | 32 | 33 | 20 | 21 | 22 | 23 | 10 | 11 | 12 | 13 | 00 | 01 | 02 | 03 |
| 00 | 01 | 02 | 03 | 30 | 31 | 32 | 33 | 20 | 21 | 22 | 23 | 10 | 11 | 12 | 13 |
| 10 | 11 | 12 | 13 | 00 | 01 | 02 | 03 | 30 | 31 | 32 | 33 | 20 | 21 | 22 | 23 |
| 20 | 21 | 22 | 23 | 10 | 11 | 12 | 13 | 00 | 01 | 02 | 03 | 30 | 31 | 32 | 33 |
| 30 | 31 | 32 | 33 | 20 | 21 | 22 | 23 | 10 | 11 | 12 | 13 | 00 | 01 | 02 | 03 |
| 00 | 01 | 02 | 03 | 30 | 31 | 32 | 33 | 20 | 21 | 22 | 23 | 10 | 11 | 12 | 13 |

FIG. 22

DELAY A PROCESSING START POSITION BY 1 PIXEL IN A MAIN SCANNING DIRECTION

EXCHANGE: 0,  X_Ū/D: 0,   Y_Ū/D: 0
X_SIZE: 3,    X_START: 1, X_SHIFT: 0
Y_SIZE: 3,    Y_START: 0, Y_SHIFT: 0

| 00 | 00 | 01 | 02 | 03 | 00 | 01 | 02 | 03 | 00 | 01 | 02 | 03 | 00 | 01 | 02 |
|----|----|----|----|----|----|----|----|----|----|----|----|----|----|----|----|
| 10 | 10 | 11 | 12 | 13 | 10 | 11 | 12 | 13 | 10 | 11 | 12 | 13 | 10 | 11 | 12 |
| 20 | 20 | 21 | 22 | 23 | 20 | 21 | 22 | 23 | 20 | 21 | 22 | 23 | 20 | 21 | 22 |
| 30 | 30 | 31 | 32 | 33 | 30 | 31 | 32 | 33 | 30 | 31 | 32 | 33 | 30 | 31 | 32 |
| 00 | 00 | 01 | 02 | 03 | 00 | 01 | 02 | 03 | 00 | 01 | 02 | 03 | 00 | 01 | 02 |
| 10 | 10 | 11 | 12 | 13 | 10 | 11 | 12 | 13 | 10 | 11 | 12 | 13 | 10 | 11 | 12 |
| 20 | 20 | 21 | 22 | 23 | 20 | 21 | 22 | 23 | 20 | 21 | 22 | 23 | 20 | 21 | 22 |
| 30 | 30 | 31 | 32 | 33 | 30 | 31 | 32 | 33 | 30 | 31 | 32 | 33 | 30 | 31 | 32 |

FIG. 23

DELAY A PROCESSING START POSITION BY 2 PIXELS IN A MAIN SCANNING DIRECTION

EXCHANGE: 0,  X_Ū/D: 0,   Y_Ū/D: 0
X_SIZE: 3,    X_START: 2, X_SHIFT: 0
Y_SIZE: 3,    Y_START: 0, Y_SHIFT: 0

| 00 | 00 | 00 | 01 | 02 | 03 | 00 | 01 | 02 | 03 | 00 | 01 | 02 | 03 | 00 | 01 |
|----|----|----|----|----|----|----|----|----|----|----|----|----|----|----|----|
| 10 | 10 | 10 | 11 | 12 | 13 | 10 | 11 | 12 | 13 | 10 | 11 | 12 | 13 | 10 | 11 |
| 20 | 20 | 20 | 21 | 22 | 23 | 20 | 21 | 22 | 23 | 20 | 21 | 22 | 23 | 20 | 21 |
| 30 | 30 | 30 | 31 | 32 | 33 | 30 | 31 | 32 | 33 | 30 | 31 | 32 | 33 | 30 | 31 |
| 00 | 00 | 00 | 01 | 02 | 03 | 00 | 01 | 02 | 03 | 00 | 01 | 02 | 03 | 00 | 01 |
| 10 | 10 | 10 | 11 | 12 | 13 | 10 | 11 | 12 | 13 | 10 | 11 | 12 | 13 | 10 | 11 |
| 20 | 20 | 20 | 21 | 22 | 23 | 20 | 21 | 22 | 23 | 20 | 21 | 22 | 23 | 20 | 21 |
| 30 | 30 | 30 | 31 | 32 | 33 | 30 | 31 | 32 | 33 | 30 | 31 | 32 | 33 | 30 | 31 |

FIG. 24

DELAY A PROCESSING START POSITION BY 3 PIXELS IN A MAIN SCANNING DIRECTION

EXCHANGE: 0,    X_U̅/D: 0,    Y_U̅/D: 0
X_SIZE: 3,     X_START: 3,   X_SHIFT: 0
Y_SIZE: 3,     Y_START: 0,   Y_SHIFT: 0

| 00 | 00 | 00 | 00 | 01 | 02 | 03 | 00 | 01 | 02 | 03 | 00 | 01 | 02 | 03 | 00 |
|----|----|----|----|----|----|----|----|----|----|----|----|----|----|----|----|
| 10 | 10 | 10 | 10 | 11 | 12 | 13 | 10 | 11 | 12 | 13 | 10 | 11 | 12 | 13 | 10 |
| 20 | 20 | 20 | 20 | 21 | 22 | 23 | 20 | 21 | 22 | 23 | 20 | 21 | 22 | 23 | 20 |
| 30 | 30 | 30 | 30 | 31 | 32 | 33 | 30 | 31 | 32 | 33 | 30 | 31 | 32 | 33 | 30 |
| 00 | 00 | 00 | 00 | 01 | 02 | 03 | 00 | 01 | 02 | 03 | 00 | 01 | 02 | 03 | 00 |
| 10 | 10 | 10 | 10 | 11 | 12 | 13 | 10 | 11 | 12 | 13 | 10 | 11 | 12 | 13 | 10 |
| 20 | 20 | 20 | 20 | 21 | 22 | 23 | 20 | 21 | 22 | 23 | 20 | 21 | 22 | 23 | 20 |
| 30 | 30 | 30 | 30 | 31 | 32 | 33 | 30 | 31 | 32 | 33 | 30 | 31 | 32 | 33 | 30 |

FIG. 25

DELAY A PROCESSING START POSITION BY 1 PIXEL IN A SUBSCANNING DIRECTION

EXCHANGE: 0,    X_U̅/D: 0,    Y_U̅/D: 0
X_SIZE: 3,     X_START: 0,   X_SHIFT: 0
Y_SIZE: 3,     Y_START: 1,   Y_SHIFT: 0

| 00 | 01 | 02 | 03 | 00 | 01 | 02 | 03 | 00 | 01 | 02 | 03 | 00 | 01 | 02 | 03 |
|----|----|----|----|----|----|----|----|----|----|----|----|----|----|----|----|
| 00 | 01 | 02 | 03 | 00 | 01 | 02 | 03 | 00 | 01 | 02 | 03 | 00 | 01 | 02 | 03 |
| 10 | 11 | 12 | 13 | 10 | 11 | 12 | 13 | 10 | 11 | 12 | 13 | 10 | 11 | 12 | 13 |
| 20 | 21 | 22 | 23 | 20 | 21 | 22 | 23 | 20 | 21 | 22 | 23 | 20 | 21 | 22 | 23 |
| 30 | 31 | 32 | 33 | 30 | 31 | 32 | 33 | 30 | 31 | 32 | 33 | 30 | 31 | 32 | 33 |
| 00 | 01 | 02 | 03 | 00 | 01 | 02 | 03 | 00 | 01 | 02 | 03 | 00 | 01 | 02 | 03 |
| 10 | 11 | 12 | 13 | 10 | 11 | 12 | 13 | 10 | 11 | 12 | 13 | 10 | 11 | 12 | 13 |
| 20 | 21 | 22 | 23 | 20 | 21 | 22 | 23 | 20 | 21 | 22 | 23 | 20 | 21 | 22 | 23 |

FIG. 26

DELAY A PROCESSING START POSITION BY 2 PIXELS IN A SUBSCANNING DIRECTION

EXCHANGE: 0,   X_U̅/D: 0,   Y_U̅/D: 0
X_SIZE: 3,    X_START: 0,  X_SHIFT: 0
Y_SIZE: 3,    Y_START: 2,  Y_SHIFT: 0

| 00 | 01 | 02 | 03 | 00 | 01 | 02 | 03 | 00 | 01 | 02 | 03 | 00 | 01 | 02 | 03 |
|----|----|----|----|----|----|----|----|----|----|----|----|----|----|----|----|
| 00 | 01 | 02 | 03 | 00 | 01 | 02 | 03 | 00 | 01 | 02 | 03 | 00 | 01 | 02 | 03 |
| 00 | 01 | 02 | 03 | 00 | 01 | 02 | 03 | 00 | 01 | 02 | 03 | 00 | 01 | 02 | 03 |
| 10 | 11 | 12 | 13 | 10 | 11 | 12 | 13 | 10 | 11 | 12 | 13 | 10 | 11 | 12 | 13 |
| 20 | 21 | 22 | 23 | 20 | 21 | 22 | 23 | 20 | 21 | 22 | 23 | 20 | 21 | 22 | 23 |
| 30 | 31 | 32 | 33 | 30 | 31 | 32 | 33 | 30 | 31 | 32 | 33 | 30 | 31 | 32 | 33 |
| 00 | 01 | 02 | 03 | 00 | 01 | 02 | 03 | 00 | 01 | 02 | 03 | 00 | 01 | 02 | 03 |
| 10 | 11 | 12 | 13 | 10 | 11 | 12 | 13 | 10 | 11 | 12 | 13 | 10 | 11 | 12 | 13 |

FIG. 27

DELAY A PROCESSING START POSITION BY 3 PIXELS IN A SUBSCANNING DIRECTION

EXCHANGE: 0,   X_U̅/D: 0,   Y_U̅/D: 0
X_SIZE: 3,    X_START: 0,  X_SHIFT: 0
Y_SIZE: 3,    Y_START: 3,  Y_SHIFT: 0

| 00 | 01 | 02 | 03 | 00 | 01 | 02 | 03 | 00 | 01 | 02 | 03 | 00 | 01 | 02 | 03 |
|----|----|----|----|----|----|----|----|----|----|----|----|----|----|----|----|
| 00 | 01 | 02 | 03 | 00 | 01 | 02 | 03 | 00 | 01 | 02 | 03 | 00 | 01 | 02 | 03 |
| 00 | 01 | 02 | 03 | 00 | 01 | 02 | 03 | 00 | 01 | 02 | 03 | 00 | 01 | 02 | 03 |
| 00 | 01 | 02 | 03 | 00 | 01 | 02 | 03 | 00 | 01 | 02 | 03 | 00 | 01 | 02 | 03 |
| 10 | 11 | 12 | 13 | 10 | 11 | 12 | 13 | 10 | 11 | 12 | 13 | 10 | 11 | 12 | 13 |
| 20 | 21 | 22 | 23 | 20 | 21 | 22 | 23 | 20 | 21 | 22 | 23 | 20 | 21 | 22 | 23 |
| 30 | 31 | 32 | 33 | 30 | 31 | 32 | 33 | 30 | 31 | 32 | 33 | 30 | 31 | 32 | 33 |
| 00 | 01 | 02 | 03 | 00 | 01 | 02 | 03 | 00 | 01 | 02 | 03 | 00 | 01 | 02 | 03 |

FIG. 28

$\begin{pmatrix}\text{SHIFT BY 1 PIXEL IN A MAIN SCANNING DIRECTION} \\ \text{BETWEEN MATRICES IN A SUBSCANNING DIRECTION}\end{pmatrix}$ + ( 90° ROTATION )

EXCHANGE: 1,   X_U̅/D: 0,   Y_U̅/D: 1
X_SIZE: 3,     X_START: 0,   X_SHIFT: 1
Y_SIZE: 3,     Y_START: 0,   Y_SHIFT: 0

| 03 | 13 | 23 | 33 | 00 | 10 | 20 | 30 | 01 | 11 | 21 | 31 | 02 | 12 | 22 | 32 |
|---|---|---|---|---|---|---|---|---|---|---|---|---|---|---|---|
| 02 | 12 | 22 | 32 | 03 | 13 | 23 | 33 | 00 | 10 | 20 | 30 | 01 | 11 | 21 | 31 |
| 01 | 11 | 21 | 31 | 02 | 12 | 22 | 32 | 03 | 13 | 23 | 33 | 00 | 10 | 20 | 30 |
| 00 | 10 | 20 | 30 | 01 | 11 | 21 | 31 | 02 | 12 | 22 | 32 | 03 | 13 | 23 | 33 |
| 03 | 13 | 23 | 33 | 00 | 10 | 20 | 30 | 01 | 11 | 21 | 31 | 02 | 12 | 22 | 32 |
| 02 | 12 | 22 | 32 | 03 | 13 | 23 | 33 | 00 | 10 | 20 | 30 | 01 | 11 | 21 | 31 |
| 01 | 11 | 21 | 31 | 02 | 12 | 22 | 32 | 03 | 13 | 23 | 33 | 00 | 10 | 20 | 30 |
| 00 | 10 | 20 | 30 | 01 | 11 | 21 | 31 | 02 | 12 | 22 | 32 | 03 | 13 | 23 | 33 |
| 03 | 13 | 23 | 33 | 00 | 10 | 20 | 30 | 01 | 11 | 21 | 31 | 02 | 12 | 22 | 32 |

FIG. 29

$\begin{pmatrix}\text{SHIFT BY 1 PIXEL IN A MAIN SCANNING DIRECTION} \\ \text{BETWEEN MATRICES IN A SUBSCANNING DIRECTION}\end{pmatrix}$ + ( 180° ROTATION )

EXCHANGE: 0,   X_U̅/D: 1,   Y_U̅/D: 1
X_SIZE: 3,     X_START: 0,   X_SHIFT: 1
Y_SIZE: 3,     Y_START: 0,   Y_SHIFT: 0

| 33 | 32 | 31 | 30 | 33 | 32 | 31 | 30 | 33 | 32 | 31 | 30 | 33 | 32 | 31 | 30 |
|---|---|---|---|---|---|---|---|---|---|---|---|---|---|---|---|
| 23 | 22 | 21 | 20 | 23 | 22 | 21 | 20 | 23 | 22 | 21 | 20 | 23 | 22 | 21 | 20 |
| 13 | 12 | 11 | 10 | 13 | 12 | 11 | 10 | 13 | 12 | 11 | 10 | 13 | 12 | 11 | 10 |
| 03 | 02 | 01 | 00 | 03 | 02 | 01 | 00 | 03 | 02 | 01 | 00 | 03 | 02 | 01 | 00 |
| 32 | 31 | 30 | 33 | 32 | 31 | 30 | 33 | 32 | 31 | 30 | 33 | 32 | 31 | 30 | 33 |
| 22 | 21 | 20 | 23 | 22 | 21 | 20 | 23 | 22 | 21 | 20 | 23 | 22 | 21 | 20 | 23 |
| 12 | 11 | 10 | 13 | 12 | 11 | 10 | 13 | 12 | 11 | 10 | 13 | 12 | 11 | 10 | 13 |
| 02 | 01 | 00 | 03 | 02 | 01 | 00 | 03 | 02 | 01 | 00 | 03 | 02 | 01 | 00 | 03 |
| 31 | 30 | 33 | 32 | 31 | 30 | 33 | 32 | 31 | 30 | 33 | 32 | 31 | 30 | 33 | 32 |

FIG. 30

(SHIFT BY 1 PIXEL IN A MAIN SCANNING DIRECTION BETWEEN MATRICES IN A SUBSCANNING DIRECTION) + ( 270° ROTATION )

EXCHANGE: 1,   X_U/D: 1,     Y_U/D: 0
X_SIZE: 3,    X_START: 0,    X_SHIFT: 1
Y_SIZE: 3,    Y_START: 0,    Y_SHIFT: 0

| 30 | 20 | 10 | 00 | 33 | 23 | 13 | 03 | 32 | 22 | 12 | 02 | 31 | 21 | 11 | 01 |
|----|----|----|----|----|----|----|----|----|----|----|----|----|----|----|----|
| 31 | 21 | 11 | 01 | 30 | 20 | 10 | 00 | 33 | 23 | 13 | 03 | 32 | 22 | 12 | 02 |
| 32 | 22 | 12 | 02 | 31 | 21 | 11 | 01 | 30 | 20 | 10 | 00 | 33 | 23 | 13 | 03 |
| 33 | 23 | 13 | 03 | 32 | 22 | 12 | 02 | 31 | 21 | 11 | 01 | 30 | 20 | 10 | 00 |
| 30 | 20 | 10 | 00 | 33 | 23 | 13 | 03 | 32 | 22 | 12 | 02 | 31 | 21 | 11 | 01 |
| 31 | 21 | 11 | 01 | 30 | 20 | 10 | 00 | 33 | 23 | 13 | 03 | 32 | 22 | 12 | 02 |
| 32 | 22 | 12 | 02 | 31 | 21 | 11 | 01 | 30 | 20 | 10 | 00 | 33 | 23 | 13 | 03 |
| 33 | 23 | 13 | 03 | 32 | 22 | 12 | 02 | 31 | 21 | 11 | 01 | 30 | 20 | 10 | 00 |
| 30 | 20 | 10 | 00 | 33 | 23 | 13 | 03 | 32 | 22 | 12 | 02 | 31 | 21 | 11 | 01 |

MATRIX ADDRESS GENERATOR AND MULTIVALUE GRADATION PROCESSOR HAVING THE SAME

BACKGROUND OF THE INVENTION

1. Technical Field

The present invention relates to a multivalue gradation processor for images provided in an image forming apparatus, and more particularly to the improvement of an address generator which generates an address for specifying the memory table of a dither matrix memory in the case where a multivalue gradation processing for images is carried out by using the dither matrix memory.

2. Background of Art

There has been used a method for reproducing half-tone images in the image forming apparatus such as a dither method, a density pattern method or an area gradation method using them together (hereinafter referred to as "a multivalue dither method"). Various digital image forming apparatuses such as a digital copying apparatus, a digital facsimile apparatus, a digital printer and the like have variously been devised in order to reproduce a good half-tone image by utilizing the above-mentioned methods.

RELATED ART

By way of example, the prior art related to the present invention has been disclosed in Japanese Laid Open Gazette No. 288449/1989, wherein a dither pattern obtained by rotating a general spiral dither pattern at an angle of 90 degrees is used for color recording so that the area of color shift is reduced at the time of color image reproduction and color reproducibility can be enhanced.

Japanese Laid Open Gazette No. 114159/1989 has disclosed an improved method for generating binary half-tone images by using a dither matrix. Referring to this method, a first dither matrix having a normal pattern and a second dither matrix having a pattern which is formed by shifting the normal pattern by two rows are stored in a dither matrix memory so that a threshold is read out of the first dither matrix and the second dither matrix in a main scanning direction (laterally). Consequently, a half-tone image formed based on the threshold has black pixels dispersed without deflecting to a predetermined row, so that an image of high quality can be obtained.

Japanese Laid Open Gazette No. 160258/1989 has also disclosed a method for generating binary half-tone images by using a dither matrix. According to the prior art, thresholds are read out of the dither matrix regularly and repeatedly so that the half-tone image has black pixels deflected and is not of high quality. Referring to a disclosed method, in the case where the threshold is read out of the dither matrix in a main scanning direction (laterally), the dither matrix is shifted longitudinally and sequentially. In addition, a counter is used for specifying the address of the dither matrix in order to read out the threshold. The counting start value of the counter is varied for each line. More specifically, (1) the initial value of the counter is preloaded by software, (2) a clock for count-up is provided when a scanning operation is transferred from the previous line to the next line such that the initial value of the counter corresponds to that of the next line, and (3) a limit is set to the range of reading so as to forcibly correspond the initial value of the counter to a predetermined value when the scanning operation is transferred to the next line.

Referring to the prior art described above, it is common that the order and method of reading thresholds out of a dither matrix memory are varied to generate a half-tone image by a dither method so that good half-tone image can be obtained.

According to a technique disclosed in Japanese Laid Open Gazette No. 288449/1989, however, various kinds of dither patterns cannot be generated. Consequently, the order of reading out the thresholds cannot be changed according to the color of an image or the like.

According to the methods disclosed in Japanese Laid Open Gazette No. 114159/1989 or 160258/1989, the thresholds are read out of the dither matrix which is longitudinally shifted. Consequently, the order of reading out the thresholds can be changed. According to the former method, however, a mass dither matrix memory or a plurality of dither matrix memories should be prepared to change the order of reading out the thresholds according to the quality of an image or the like. The reason is that plurality of the dither matrices, each of which has the quantity of shifting varied by the longitudinal shifting of first and second dither matrices, should be stored.

According to the method disclosed in Japanese Laid Open Gazette No. 160258/1989, it is sufficient that only one dither matrix having a normal pattern is stored in the dither matrix memory. Referring to an addressing method using a counter which has been disclosed, addressing can be performed only for shifting the dither matrix longitudinally and sequentially. Consequently, the addressing is carried out without variety.

SUMMARY OF THE INVENTION

It is an object of the present invention to provide a matrix address generator for generating various memory addresses for specifying the memory table such that the memory table of a dither matrix memory can be specified in optional order and with an optional pattern, in which thresholds are variously read out of the dither matrix memory so that the reproducibility of half-tone images can be enhanced.

It is another object of the present invention to provide a multivalue gradation processor for images in which thresholds can be read out of a dither matrix memory in optional order and with an optional pattern so as to obtain good half-tone images.

The matrix address generator according to the present invention comprises a dot counter for repeatedly counting X pulses to be provided within a first counted value range which is predetermined, a line counter for repeatedly counting Y pulses to be provided within a second counted value range which is predetermined, and outputting counted values as Y addresses, an X shift address counter for repeatedly counting within a predetermined counted value range shift addresses which shift X addresses, and an adder for adding together values counted by the dot counter and values counted by the X shift address counter in synchronism with the X pulses, and outputting addition values as the X addresses.

From an aspect of the present invention, the X addresses can be shifted. In this case, the X pulses are repeatedly counted by the dot counter. In addition, the shift addresses for shifting the X addresses are repeatedly counted by the X shift address counter. The values counted by the dot counter and the X shift address counter are added together in synchronism with the X pulses. Consequently, the shifted X addresses are sequentially outputted.

From another aspect of the present invention, the Y addresses can be shifted. The Y address to be shifted is a value obtained by adding together the values counted by the line counter and the Y shift address counter in synchronous with the X pulse.

From yet another aspect of the present invention, it is possible to selectively shift the X or Y address.

From a further aspect of the present invention, the matrix address can be rotated.

Moreover, it is possible to generate a matrix address in which address shifting is combined with matrix rotation.

Furthermore, it is possible to select a memory table from a multivalue gradation data memory by using any one of the above-mentioned matrix address generators.

According to the present invention having a comparatively simple circuit structure, there can be reproduced a good half-tone representation by a dither method. In addition, the address generating order and pattern are variously changed so that a desired screen angle can freely be given to a dither matrix pattern and the dither matrix pattern can freely be rotated. Consequently, even if input image data is changed into color image data, black-and-white image data, photo-data and the like, it is possible to produce a dither matrix pattern according to the type of the input image data. Thus, good half-tone images can be reproduced.

These and other objects, features and advantages of the present invention will become more apparent upon a reading of the following detailed description and drawings.

BRIEF DESCRIPTION OF THE DRAWINGS

FIG. 4 is a diagram for explaining the relationship between input addresses and the contents of output data stored in the memory table shown in FIG. 3;

FIG. 5 is a diagram showing a memory table matrix provided in the gradation data storage means according to an embodiment of the present invention;

FIG. 6 is a diagram showing the memory map of the memory table matrix shown in FIG. 5;

FIG. 7 is a diagram for explaining one of the basic functions according to an embodiment of the present invention, in which a matrix is longitudinally shifted;

FIG. 8 is a diagram for explaining one of the basic functions according to an embodiment of the present invention, in which a basic matrix is laterally shifted;

FIG. 12 is a diagram showing a normal state in which a 4×4 basic matrix is neither shifted nor rotated;

FIG. 13 is a diagram showing a state in which the 4×4 basic matrix is rotated by 90 degrees;

FIG. 14 is a diagram showing a state in which the 4×4 basic matrix-is rotated by 180 degrees;

FIG. 15 is a diagram showing a state in which the 4×4 basic matrix is rotated by 270 degrees;

FIG. 16 is a diagram showing a state in which the 4×4 basic matrix is shifted by 1 pixel in a reverse main scanning direction between the matrices in a subscanning direction;

FIG. 17 is a diagram showing a state in which the 4×4 basic matrix is shifted by 2 pixels in the reverse main scanning direction between the matrices in the subscanning direction;

FIG. 18 is a diagram showing a state in which the 4×4 basic matrix is shifted by 3 pixels in the reverse main scanning direction between the matrices in the subscanning direction;

FIG. 19 is a diagram showing a state in which the 4×4 basic matrix is shifted by 1 pixel (1 line) in a reverse subscanning direction between the matrices in a main scanning direction;

FIG. 20 is a diagram showing a state in which the 4×4 basic matrix is shifted by 2 pixels (2 lines) in the reverse subscanning direction between the matrices in the main scanning direction;

FIG. 21 is a diagram showing a state in which the 4×4 basic matrix is shifted by 3 pixels (3 lines) in the reverse subscanning direction between the matrices in the main scanning direction;

FIG. 22 is a diagram showing a state in which the processing start position of the 4×4 basic matrix is delayed by 1 pixel in the main scanning direction;

FIG. 23 is a diagram showing a state in which the processing start position of the 4×4 basic matrix is delayed by 2 pixels in the main scanning direction;

FIG. 24 is a diagram showing a state in which the processing start position of the 4×4 basic matrix is delayed by 3 pixels in the main scanning direction;

FIG. 25 is a diagram showing a state in which the processing start position of the 4×4 basic matrix is delayed by 1 pixel (1 line) in the subscanning direction;

FIG. 26 is a diagram showing a state in which the processing start position of the 4×4 basic matrix is delayed by 2 pixels (2 lines) in the subscanning direction;

FIG. 27 is a diagram showing a state in which the processing start position of the 4×4 basic matrix is delayed by 3 pixels (3 lines) in the subscanning direction;

FIG. 28 is a diagram showing a state in which the 4×4 basic matrix is shifted by 1 pixel in the main scanning direction between the matrices in the subscanning direction and is rotated by 90 degrees;

FIG. 29 is a diagram showing a state in which the 4×4 basic matrix is shifted by 1 pixel in the main scanning direction between the matrices in the subscanning direction and is rotated by 180 degrees;

FIG. 30 is a diagram showing a state in which the 4×4 basic matrix is shifted by 1 pixel in the main scanning direction between the matrices in the subscanning direction and is rotated by 270 degrees;

DETAILED DESCRIPTION OF THE PREFERRED EMBODIMENT

Figure 1:
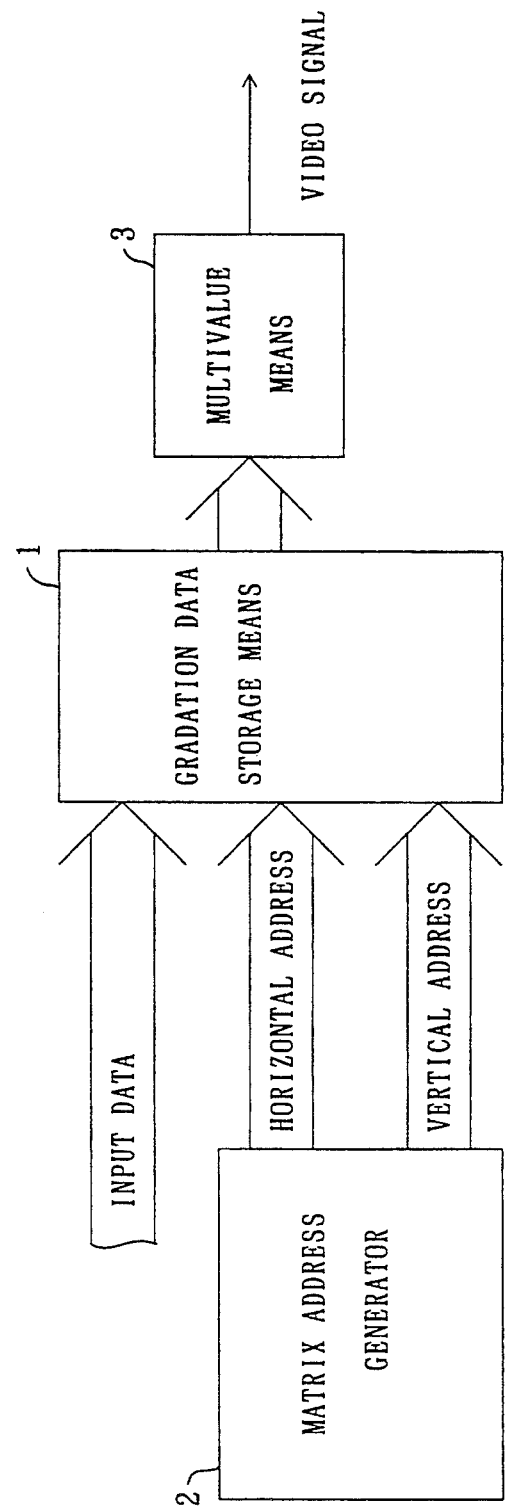
FIG. 1 is a block diagram showing the schematic structure of a multivalue gradation processor for images according to an embodiment of the present invention.

FIG. 1 is a block diagram showing the schematic structure of a multivalue gradation processor for images according to an embodiment of the present invention. The multivalue gradation processor is provided with storage means 1 in which multivalue gradation data are stored. As will be described later in detail, the gradation data storage means 1 includes a plurality of memory tables to which addresses are allocated in a matrix having m rows and n columns (hereinafter referred to as "m×n", for example, "3×2" when m=3 and n=2). The multivalue gradation data is stored for each memory table. The memory tables to which the addresses are allocated in a matrix can be selected by specifying a horizontal address and a vertical address. Based on the multivalue gradation data stored in the memory table thus selected, a gradation processing for input data is carried out.

The present embodiment is characterized by the contents of a matrix address generator 2 which gives the horizontal address and the vertical address to the gradation data storage means 1. There will be described in detail a method for generating the horizontal address and the vertical address by means of the matrix address generator 2.

Data outputted from the gradation data storage means 1 is sent to a multivalue means 3. The multivalue means 3 serves to create PWM data for controlling laser beams. More specifically, the multivalue means 3 creates pulse width data for determining a laser lighting time period per one pixel. The pulse data thus created are provided as a video signal to a laser control circuit (not shown) and the like.

Figures 2, 3:
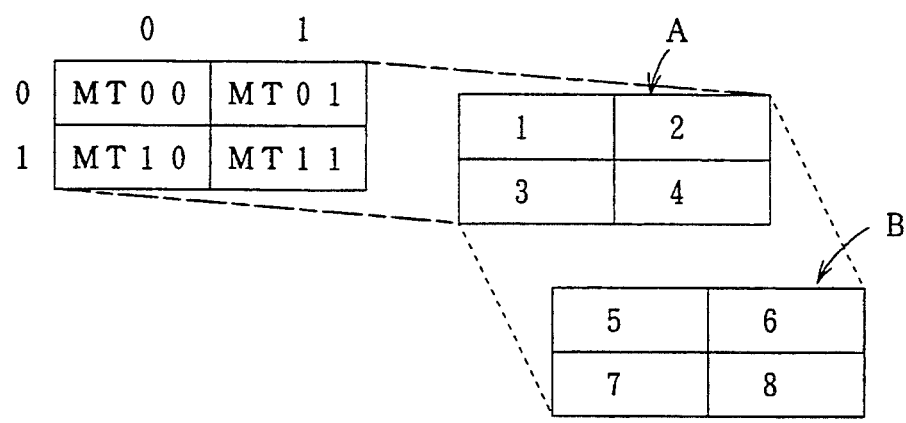
FIG. 2 is a diagram for explaining the contents of a memory table provided in a gradation data storage means.
FIG. 3 is a diagram for explaining the summary of a memory map of the gradation data storage means.

FIGS. 2, 3 and 4 are diagrams for explaining how to select the memory table by using the horizontal address, the vertical address and the contents of the gradation data stored in the gradation data storage means 1 shown in FIG. 1. For simplicity, FIGS. 2 to 4 show the case where addresses are assigned such that the memory tables MT00, MT01, MT10 and MT11 are arranged in a matrix.

With reference to FIG. 2, there will be described the case where 1 pixel is made ternary by a 2×2 dither matrix. Two thresholds are necessary for making 1 pixel ternary. More specifically, input data (for example, X) to be provided is compared with two thresholds (for example, "1"and "5") so as to be made ternary. By way of example, when the input data X is equal to 0, there can be obtained ternary output data "00" expressed by using two bits because of $0 < 1 < 5$. When the input data X is equal to 3, there can be obtained output data "10" (or "01") because of $1 < 3 < 5$. When the input data X is equal to 7, there can be obtained output data "11" because of $1 < 5 < 7$.

Accordingly, first and second dither matrices A and B are necessary for making 1 pixel ternary by the 2×2 dither matrix.

FIG. 2 shows the relationship between the memory tables MT00, MT01, MT10 and MT11, and the first and second dither matrices A and B. In the memory table MT00, gradation data based on a threshold "pb 1" of the first dither matrix A and a threshold "5" of the second dither matrix B are stored. In the memory table MT01, gradation data based on a threshold "2" of the first dither matrix A and a threshold "6" of the second dither matrix B are stored. In the memory table MT10, gradation data based on thresholds "3" and "7" are stored. In the memory table MT11, gradation data based on thresholds "4" and "8" are stored.

If the horizontal address and the vertical address are provided, the memory tables MT00 to MT11 can be specified. More specifically, the memory tables MT00 to MT11 can be selected by the horizontal addresses of low-order 2 bits and the vertical addresses of high-order 2 bits as shown in FIG. 3.

FIG. 4 shows the relationship between input addresses and gradation data stored in the memory tables MT00 to MT11. As described with reference to FIG. 2, in the memory tables MT00 to MT11, gradation data based on the thresholds of the first and second dither matrices A and B are stored. The gradation data are not two thresholds themselves but result data obtained by comparing input data X with the two thresholds. If the input data X is comprised of 3 bits, X takes 8 kinds of values, i.e., X=000, 001, 010, ..., 111. For this reason, in the memory tables MT00 to MT11, data which are obtained by comparing the respective input data X of 000 to 111 with the two thresholds are stored.

As apparent from FIG. 4, the gradation data stored in the memory tables MT00 to MT11 are based on two thresholds which are different from each other. Consequently, the contents of the gradation data related to the input address, i.e., input data X are varied for each of the memory tables MT00 to MT11.

Input addresses "000" to "111" shown in FIG. 4 are different from addresses shown in FIG. 3. The addresses shown in FIG. 3 (horizontal and vertical addresses) serve to specify any of the memory tables MT00 to MT11. The addresses shown in FIG. 4 serve to specify any of gradation data stored in-the specified memory table.

The input data can be used as an input address to coincide with a bit number. Consequently, there can be read out gradation data corresponding to the input data.

There has been described the basic function of the multivalue gradation processor according to the present embodiment shown in FIG. 1.

A memory table provided in the gradation data storage means 1 will be described more specifically.

FIG. 5 shows a memory table matrix in which addresses are allocated in a 4×4 matrix. 16 Memory tables MT00 to MT33 forming the 4×4 matrix are stored in the gradation data storage means 1 (see FIG. 1). In fact, the memory tables MT00 to MT33 are mapped as shown in FIG. 6, so that the memory table can optionally be selected when a table address is determined.

Meanwhile, the table addresses are represented by decimal numbers in FIG. 5 and binary numbers in FIG. 6. In FIG. 6, low-order 2 bits are X-direction addresses (horizontal addresses) and high-order 2 bits are Y-direction addresses (vertical addresses).

The present embodiment is characterized by a method or order of generating table addresses which select memory tables. As will-be described below, an optional memory table can sequentially be selected in optional order, or a specific memory table group can sequentially be selected according to specific rules.

More specifically, a limit is set to the variable range of the table address so that the 4×4 memory table matrix shown in FIG. 5 is used as 2×2, 2×3, 2×4, 3×2, 3×3 and 3×4 matrices. In other words, a matrix size to be used can be varied.

In the case where a desired matrix size is determined to be repeatedly used as a basic matrix in a main scanning direction (X or line direction) as described above, i.e., the basic matrix is arranged in the main scanning direction, the ordinary arrangement will be made as shown in FIG. 7 (A), however, such arrangement can be made as shown in FIG. 7 (B) in which the next matrix in the main scanning direction can sequentially be shifted in a subscanning direction. A quantity of shifting in the subscanning direction can freely be determined for each memory table, i.e., for each line. If the basic matrix has a 4×4 size, shifting can be carried out by 3 lines at most. FIG. 7 (B) shows an example in which the shifting is carried out by 1 line.

In the case where the basic matrix is arranged in the main scanning direction, the processing itself of the arrangement by shifting the next matrix in the subscanning direction is the same as in Japanese Laid Open Gazette No. 160258/1989 which was afore-mentioned as prior art.

In the case where the basic matrix is sequentially used in the subscanning direction, i.e., the basic matrix is arranged in the subscanning direction (see FIG. 8 (A)), the next matrix in the subscanning direction can sequentially be shifted in the main scanning direction (see FIG. 8 (B)). A quantity of shifting can freely be set for each memory table, i.e., for each pixel. If the basic matrix has a 4×4 size, shifting can be carried out by 3 pixels at most. FIG. 8 (B) shows an example in which the shifting is carried out by 2 pixels.

According to the present embodiment, there can alternatively be carried out the shifting process in the subscanning direction shown in FIG. 7 (B) or in the main scanning direction shown in FIG. 8 (B). In other words, there cannot simultaneously be carried out the shifting process in the main scanning and subscanning directions.

Figure 9:
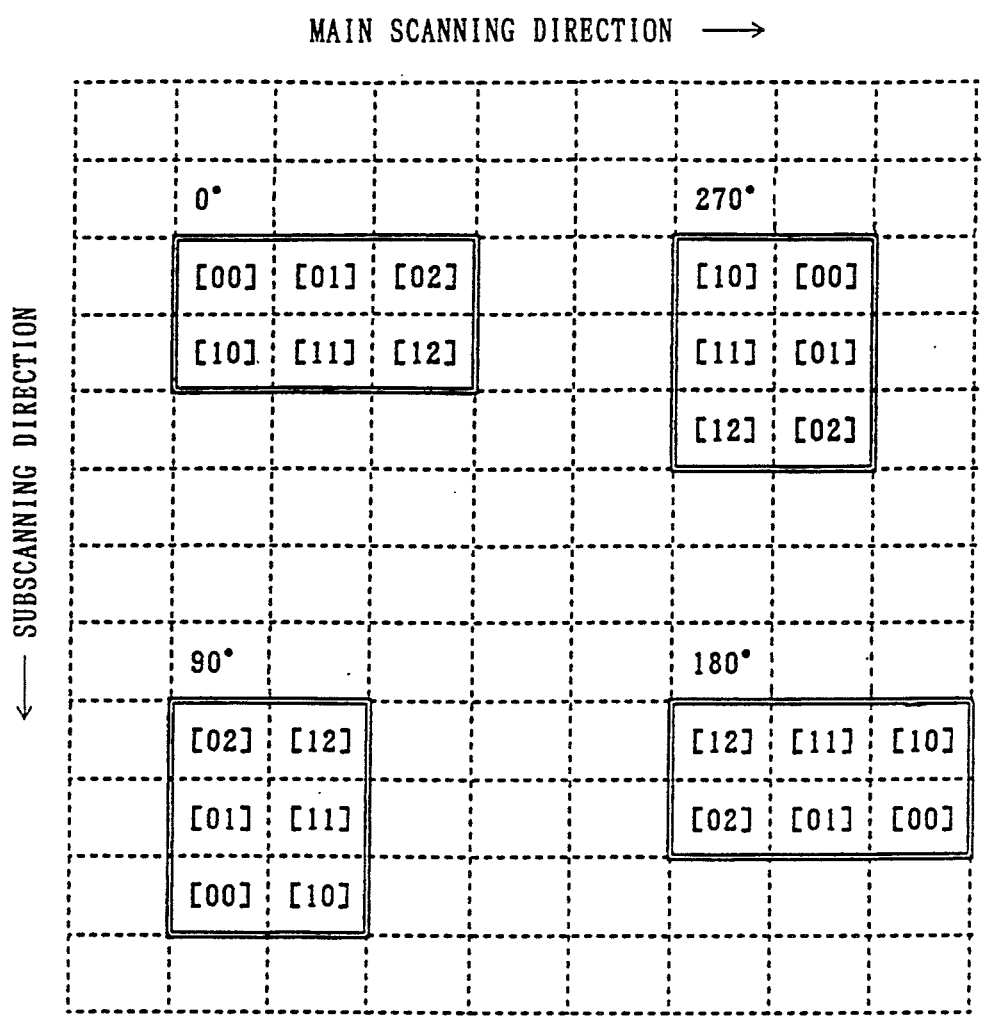
FIG. 9 is a diagram for explaining one of the basic functions according to an embodiment of the present invention, in which the rotation and type of the basic matrix are shown.

As shown in FIG. 9, the basic matrix can be rotated depending on the way that the table address (see FIG. 6) is specified. More specifically, the matrix can be rotated by a desired angle for every 90 degrees, for example, 0 degree (no rotation), 90 degrees, 180 degrees and 270 degrees. The matrix thus rotated can sequentially be used.

Figure 10:
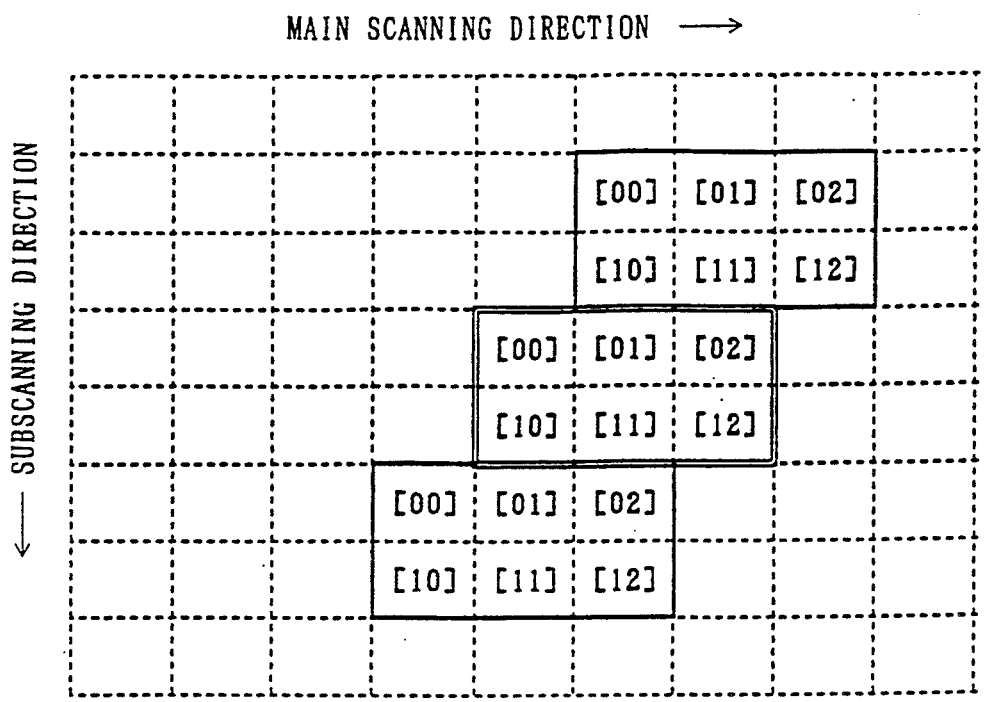
FIG. 10 is a diagram for explaining one of the basic functions according to an embodiment of the present invention, in which the matrix is simultaneously rotated and shifted.
Figure 11:
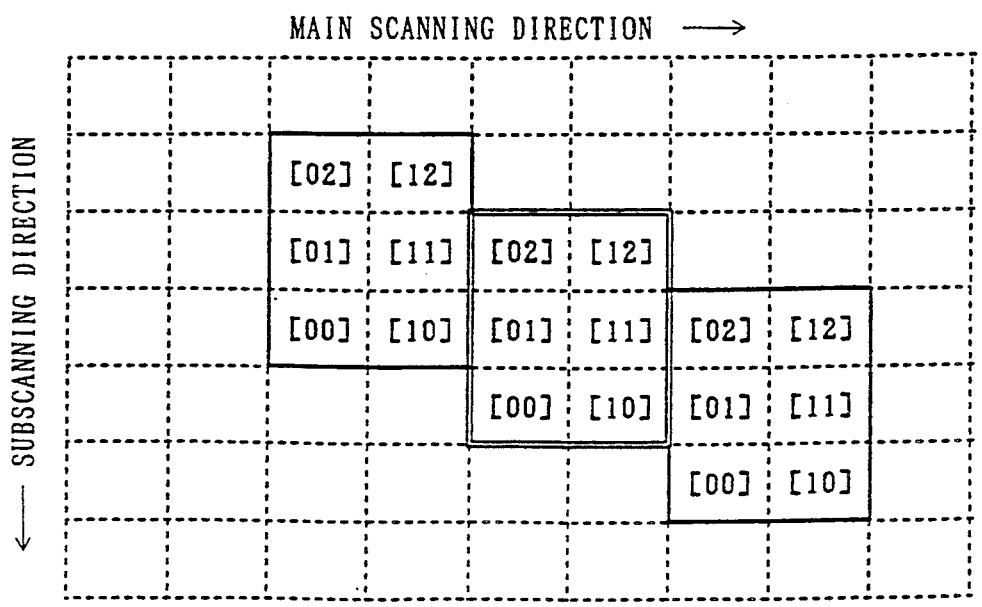
FIG. 11 is a diagram for explaining one of basic functions according to an embodiment of the present invention, in which the matrix is simultaneously rotated and shifted.

Further, according to the present embodiment, the matrix can simultaneously be rotated and shifted. In this case, the basic matrix is shifted as shown in FIG. 10 (in which a 2×3 basic matrix is shifted by 1 pixel in the main scanning direction) and is then rotated as shown in FIG. 11 (in which the basic matrix is rotated by 90 degrees). Furthermore, the output of the horizontal and vertical addresses which are outputted from the matrix address generator 2 (see FIG. 1) is delayed for each pixel or for each line, so that a processing start position can be delayed by a predetermined quantity in the main scanning or subscanning direction. When the processing start position is delayed, a yellow dither processing start position, a magenta dither processing start position, and a cyanogen dither processing start position can be varied in case of color copying as will be described below. Consequently, there can be obtained a copy having good coloring and the like.

As described above, in the case where a m×n memory table matrix stored in the gradation data storage means 1 (see FIG. 1) is selected by the horizontal and vertical addresses, the basic matrix size can be set, the shifting can be carried out in the main scanning and subscanning directions, rotation can be carried out, the shifting and rotation can simultaneously be carried out, and the processing start timing can be delayed. Consequently, when the processed basic matrix is used, various and good multivalue gradation processings can be carried out for input data. In particular, a dither matrix pattern can be set according to the type and color of the input data or the like.

FIGS. 12 to 30 show a specific arrangement as a concrete example in which the 4×4 memory table matrix shown in FIG. 5 is used.

In FIGS. 12 to 30, EXCHANGE, X. U/D, Y. U/D, X. SIZE, X. START, X. SHIFT, Y. SIZE, Y. START, and Y. SHIFT denoted above the matrix represent the set data values in a specific structural circuit to be described below with reference to FIGS. 31 to 37.

FIG. 12 is a diagram showing a normal state in which a 4×4 basic matrix is neither shifted nor rotated.

FIG. 13 is a diagram showing a state in which the 4×4 basic matrix is rotated by 90 degrees.

FIG. 14 is a diagram showing a state in which the 4×4 basic matrix is rotated by 180 degrees.

FIG. 15 is a diagram showing a state in which the 4×4 basic matrix is rotated by 270 degrees.

FIG. 16 is a diagram showing a state in which the 4×4 basic matrix is shifted by 1 pixel in a reverse main scanning direction between matrices in a subscanning direction.

FIG. 17 is a diagram showing a state in which the 4×4 basic matrix is shifted by 2 pixels in the reverse main scanning direction between the matrices in the subscanning direction.

FIG. 18 is a diagram showing a state in which the 4×4 basic matrix is shifted by 3 pixels in the reverse main scanning direction between the matrices in the subscanning direction.

FIG. 19 is a diagram showing a state in which the 4×4 basic matrix is shifted by 1 pixel (1 line) in a reverse subscanning direction between matrices in a main scanning direction.

FIG. 20 is a diagram showing a state in which the 4×4 basic matrix is shifted by 2 pixels (2 lines) in the reverse subscanning direction between the matrices in the main scanning direction.

FIG. 21 is a diagram showing a state in which the 4×4 basic matrix is shifted by 3 pixels (3 lines) in the reverse subscanning direction between the matrices in the main scanning direction.

FIG. 22 is a diagram showing a state in which the processing start position of the 4×4 basic matrix is delayed by 1 pixel in the main scanning direction.

FIG. 23 is a diagram showing a state in which the processing start position of the 4×4 basic matrix is delayed by 2 pixels in the main scanning direction.

FIG. 24 is a diagram showing a state in which the processing start position of the 4×4 basic matrix is delayed by 3 pixels in the main scanning direction.

FIG. 25 is a diagram showing a state in which the processing start position of the 4×4 basic matrix is delayed by 1 pixel (1 line) in the subscanning direction.

FIG. 26 is a diagram showing a state in which the processing start position of the 4×4 basic matrix is delayed by 2 pixels (2 lines) in the subscanning direction.

FIG. 27 is a diagram showing a state in which the processing start position of the 4×4 basic matrix is delayed by 3 pixels (3 lines) in the subscanning direction.

FIG. 28 is a diagram showing a state in which the 4×4 basic matrix is shifted by 1 pixel in the main scanning direction between the matrices in the subscanning direction and is rotated by 90 degrees.

FIG. 29 is a diagram showing a state in which the 4×4 basic matrix is shifted by 1 pixel in the main scanning direction between the matrices in the subscanning direction and is rotated by 180 degrees.

FIG. 30 is a diagram showing a state in which the 4×4 basic matrix is shifted by 1 pixel in the main scanning direction between the matrices in the subscanning direction and is rotated by 270 degrees.

As apparent from FIGS. 12 to 30, the arrangement of the memory table can be varied by shifting, rotating, delaying, or simultaneously shifting and rotating the matrix. The gradation data having different patterns are stored in each memory table as described above. Consequently, when the arrangement of the memory table is varied, a multivalue gradation processing output is changed so that various gradation processings can be carried out.

Now, there will be described in detail the specific structure of the matrix address generator 2 shown in FIG. 1.

Figure 31:
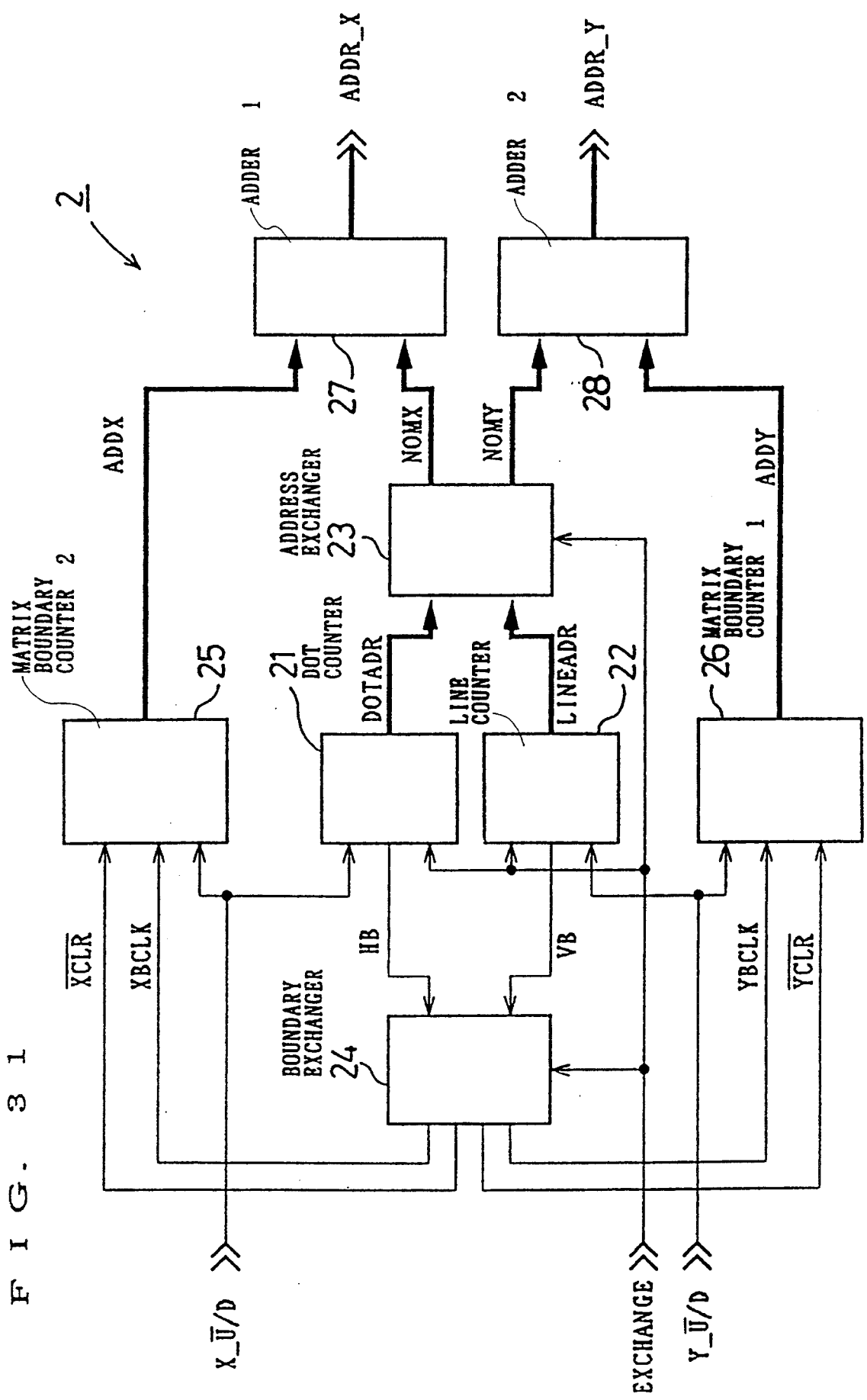
FIG. 31 is a block diagram showing the circuit structure of a matrix address generator according to an embodiment of the present invention.

FIG. 31 is a block diagram showing an example of the structure of the matrix address generator 2. As shown in FIG. 31, the matrix address generator 2 comprises a dot counting portion 21, a line counting portion 22, an address exchanging portion 23, a boundary exchanging portion 24, a matrix boundary counting portion 25 in a main scanning direction, a matrix boundary counting portion 26 in a subscanning direction, an adding portion 27 for synthesizing main scanning direction addresses (X addresses), and an adding portion 28 for synthesizing subscanning direction addresses (Y addresses). With this structure, thin lines denote 1-bit signal lines and solid lines denote data and/or signal lines having a plurality of bits, which are inputted to or outputted from each component.

The dot counting portion 21 serves to count the number of pixels at the time of main scanning. Count-up or count-down is repeated within a first counted value range which is determined by set data, i.e., the range of (main scanning direction matrix size−1). The switching of count-up or count-down is carried out based on an up/down switching signal (X. U/D) to be sent to the dot counting portion 21.

By way of example, when the set basic matrix size is 3×3, the dot counting portion 21 counts up and down pixels as follows.

In the case of count-up: 0→1→2→0→1→2→0→...
In the case of count-down: 2→1→0→2→1→0→2→...

A value counted by the dot counting portion 21 forms the basis of the horizontal address for specifying the memory table provided in the gradation data storage means 1 (see FIG. 1).

The line counting portion 22 serves to count the number of pixels (i.e., the number of lines) in the subscanning direction at the time of subscanning. Count-up or count-down is repeated within a second counted value range which is determined by set data, i.e., the range of (subscanning direction matrix size−1). The line counting portion 22 has the same structure as that of the dot counting portion 21. Only a signal sent to the line counting portion 22 is different from a signal sent to the dot counting portion 21. The count-up or count-down of the line counting portion 22 is switched based on an up/down switching signal (Y. U/D).

The dot counting portion 21 also serves to change a counting start time so as to vary a processing start position in the main scanning direction.

Similarly, the line counting portion 22 serves to change a counting start position so as to vary a processing start position in the subscanning direction.

The matrix boundary counting portions 25 and 26 serve to count matrix boundary signals HB and VB (which are sent to the counting portions 25 and 26 through the boundary exchanging portion 24 and represented by XBCLK and YBCLK), respectively. By way of example, when the set basic matrix size is 3×3 and a setting value of the shifting in the subscanning direction (longitudinally) or the main scanning direction (laterally) is 2, the matrix boundary counting portions 25 and 26 perform count-up and countdown as follows.

In the case of count-up: 0→2 (=0+2)→1 (=2+2−3)→0 (=1+2−3)→2 (=0+2)→...
In the case of count-down: 0→1 (=0−2+3)→2 (=1−2+3)→0 (=2−2)→1 (=0−2+3)→...

As seen from the above-mentioned example, a quantity of shift to be set should not exceed a matrix size. More specifically, when a matrix size is m×n, the maximum values of shift set longitudinally and laterally are (m−1) and (n−1), respectively.

The count-up or count-down of the matrix boundary counting portion 25 is switched by an up/down switching signal (X. U/D) in similar to the dot counting portion 21. The count-up or count-down of the matrix boundary counting portion 26 is switched by an up/down switching signal (Y. U/D) similar to the line counting portion 22.

Values counted by the matrix boundary counting portions 25 and 26 are repeated within the range of 0 to (matrix size−1).

The address exchanging portion 23 and the boundary exchanging portion 24 serve to exchange a dot address (DOTADR) for a line address (LINEADR) and to exchange an X direction boundary signal HB for a Y direction boundary signal VB based on an exchange signal (EXCHANGE), respectively.

The adding portion 27 serves to add together an address (NOMX) outputted from the address exchanging portion 23 and an adding address (ADDX) generated by the matrix boundary counting portion 25 so as to generate a horizontal address (ADDR. X) (The address NOMX is a dot address counted by the dot counting portion 21 when the address exchange is not carried out, and it is a line address outputted from the line counting portion 22 when the address exchange is carried out). Similarly, the adding portion 28 serves to add together an address (NOMY) outputted from the address exchanging portion 23 and an adding address (ADDY) counted by the matrix boundary counting portion 26 so as to generate a vertical address (ADDR. Y) (The address NOMY is a line address counted by the line counting portion 22 when the address exchange is not carried out, and it is a dot address outputted from the dot counting portion 21 when the address exchange is carried out).

When an output address as a result obtained by the adding portions 27 and 28 exceeds (matrix size−1), the matrix size is subtracted.

Figure 32:
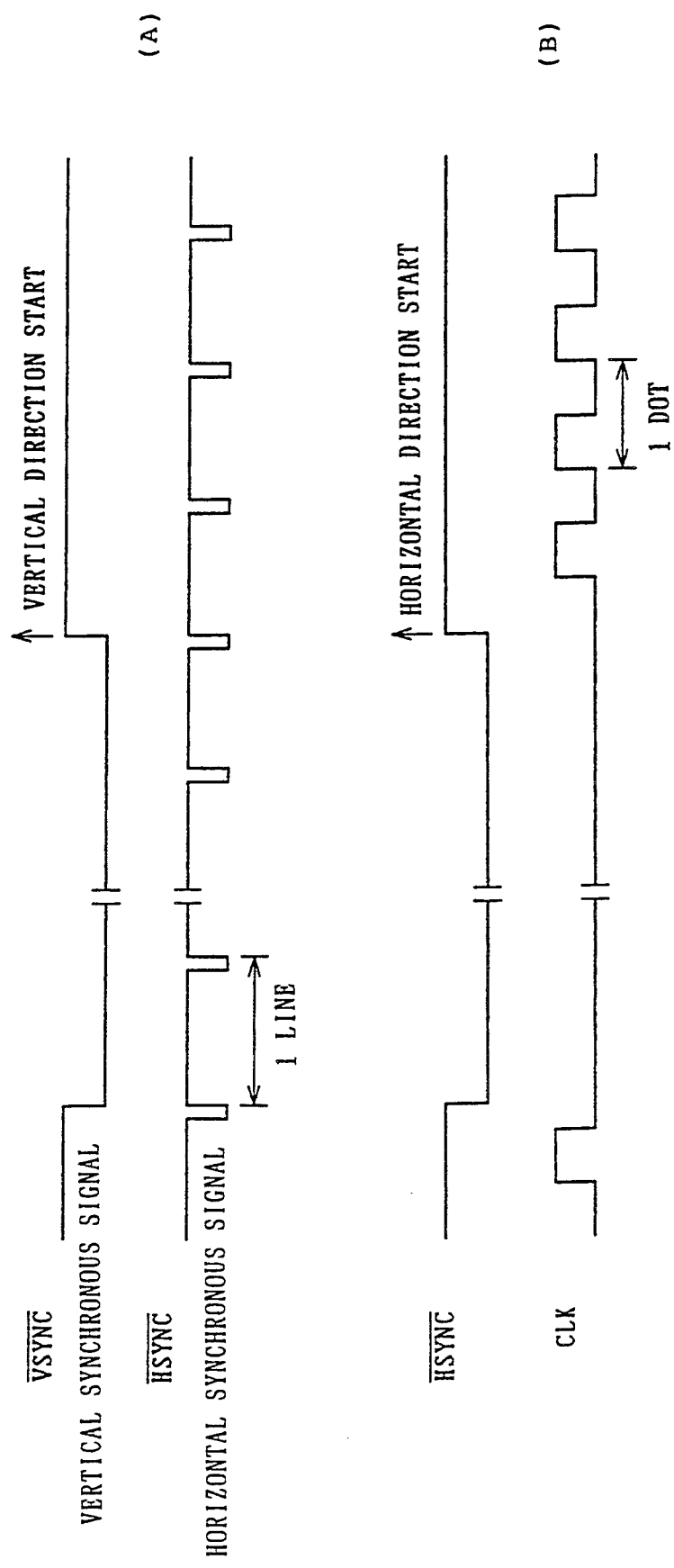
FIG. 32 is a timing chart showing the basic signal waveform of the matrix address generator.

FIGS. 32 (A) and (B) are timing charts between basic signals sent to the matrix address generator 2. FIG. 32 (A) shows timing between a vertical synchronous signal (VSYNC inverted signal) and a horizontal synchronous signal (HSYNC inverted signal). FIG. 32 (B) shows timing between the horizontal synchronous signal and a clock (CLK). The vertical synchronous signal serves to give processing start timing vertically (in the subscanning or Y direction) and to define a period in which processing can be carried out in the subscanning direction. While the vertical synchronous signal is at a high level, the processing can be carried out in the subscanning direction. The horizontal synchronous signal serves to give a processing start time horizontally (in the main scanning or X direction) and to define a period in which processing can be carried out in the main scanning direction. While the horizontal synchronous signal is at a high level, the processing can be carried out in the main scanning direction. The clock is a signal which gives basic operating timing to each component of the matrix address generator 2 and is synchronized with a pixel. Each component of the matrix address generator 2 performs processing for each pixel in synchronism with the clock.

There will be described in more detail each component of the matrix address generator 2 shown in FIG. 31.

Figure 33:
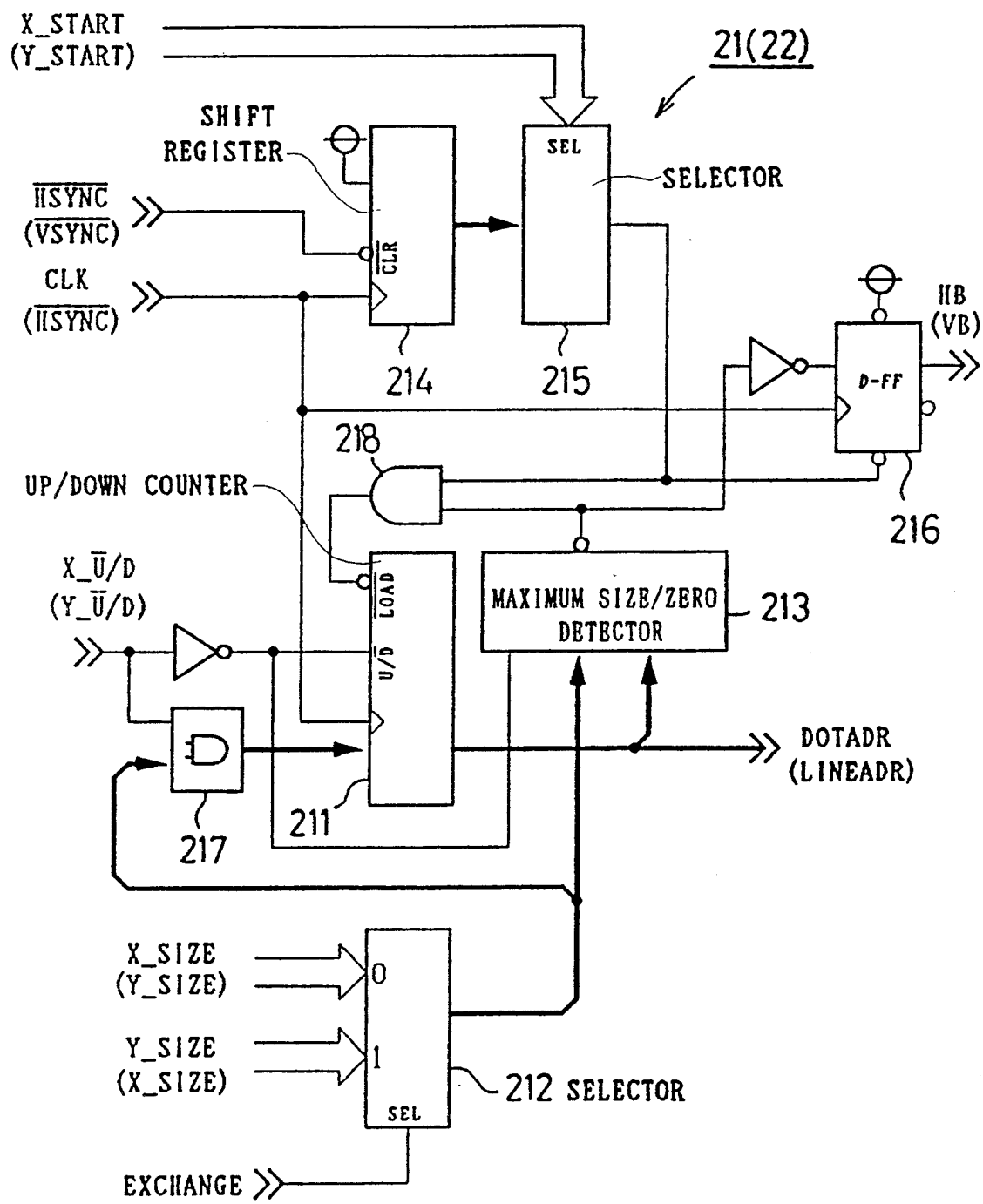
FIG. 33 is a block diagram showing the specific circuit structure of a dot counting portion and a line counting portion.

FIG. 33 is a block diagram showing the specific structure of the dot counting portion 21 and the line counting portion 22. As shown in FIG. 33, the structure of the dot counting portion 21 is the same as that of the line counting portion 22. The types of signals sent to the dot counting portion 21 and line counting portion 22 are different from each other. In the case where a circuit shown in FIG. 33 is operated as the dot counting portion 21, signals which are not put in parentheses are sent thereto. In the case where the same circuit is operated as the line counting portion 22, signals which are put in parentheses are sent thereto.

In FIG. 33, thin and solid lines denote 1-bit signal lines, and data and/or signal lines having a plurality of bits respectively in similar to FIG. 31. A double-line arrow denotes the set data of each parameter. In fact, the set data is sent from a CPU (not shown). In general, the set data is not directly sent from the CPU, but is once written to a set register and then sent therefrom. Accordingly, the set data represented by double-line arrow can be reset by the CPU if necessary, so that it can be changed into optional set data by operator manipulation or software processings. More specifically, the set data is a data value described above the matrix as shown in FIGS. 12 to 30, and specifies a basic matrix size, a shifting value of a processing start position and an angle of rotation of a matrix.

As described above, the dot counting portion 21 (line counting portion 22) is a circuit portion in which the count-up or down for the addresses is carried out for each dot (for each line) mainly and the processing start position is varied. The dot counting portion 21 (line counting portion 22) includes an up/down counter, 211, a selector 212, a detecting circuit 213, a shift register 214, a selector 215 and a flip-flop 216 as shown in FIG. 33. The up/down counter 211 serves to count up or down addresses. The selector 212 serves to select a set matrix size, i.e., an X size or a Y size. The detecting circuit 213 serves to detect the maximum size of a matrix or "0". The shift register 214 serves to shift a signal until the signal reaches a processing start position. The selector 215 serves to receive the set data for the processing start position. The flip-flop 216 serves to hold and output a matrix boundary signal.

There will be described the operation of the dot counting portion 21 shown in FIG. 33. The count-up or count-down of the up/down counter 211 is switched by an up/down switching signal (X. U/D). The up/down switching signal is also sent to the detecting circuit 213. The detecting circuit 213 detects "0" at the time of count-up, or the maximum size of the matrix provided from the selector 212 at the time of count-down.

At the time of count-up, the up/down counter 211 loads an output value "0" of an AND gate 217 (having a plurality of AND gates connected in parallel), and then performs count-up according to the input of a clock (CLK). When the detecting circuit 213 detects that an output value (DOTADR) of the counter 211 is equal to the set size data (X. SIZE) provided from the selector 212, the detecting circuit 213 outputs "low". The output of the detecting circuit 213 is connected to the LOAD control terminal of the up/down counter 211 through an AND gate 218. Consequently, the up/down counter 211 loads again the output value "0" of the AND gate 217 and repeatedly performs count-up.

At the time of count-down, the up/down counter 211 loads the set size data (X. SIZE) provided from the selector 212 through the AND gate 217 and then performs count-down according to the input of the clock (CLK). When the detecting circuit 213 detects that the output value (DOTADR) of the counter 211 is "0", it outputs "low". The output of the detecting circuit 213 is connected to the LOAD control terminal of the up/down counter 211 through the AND gate 218. Consequently, the up/down counter 211 loads again the set size data (X. SIZE) provided from the selector 212 through the AND gate 217 and repeatedly performs count-down.

A value counted by the up/down counter 211 is outputted as a dot address (DOTADR). When an exchange signal (EXCHANGE) is sent to the selector 212, the size data is switched from (X. SIZE) to (Y. SIZE) and vice versa. The set data (X. SIZE) and (Y. SIZE) provided to the selector 212 are not matrix sizes but the maximum values of the addresses, i.e., (matrix size−1).

If the selection of the selector 215 is changed by the set data (X. START), processing is started. More specifically, the shift register 214 starts operation when a horizontal synchronous signal (HSYNC inverted signal) rises. Every time a clock (CLK) is provided, shifting is carried out. A plurality of shifting values thus processed are provided to the selector 215. The selector 215 selects any of the shift values based on the set data (X. START) and outputs the same as a processing start signal. Until the processing start signal is outputted from the selector 215, the loading of the up/down counter 211 is controlled. Until the processing start position is obtained, the up/down counter 211 keeps an initial value loaded and performs neither count-up nor count-down.

When the processing start signal is outputted from the selector 215, the output of the detecting circuit 213 then becomes "low" and the clock (CLK) is provided, the flip-flop 216 is set so that a matrix boundary in the main scanning direction is detected. Consequently, a boundary signal (HB) is outputted. However, when the output of the detecting circuit 213 becomes "high" and the clock (CLK) is provided, the flip-flop 216 is reset. Consequently, the boundary signal (HB) is not outputted.

Figure 34:
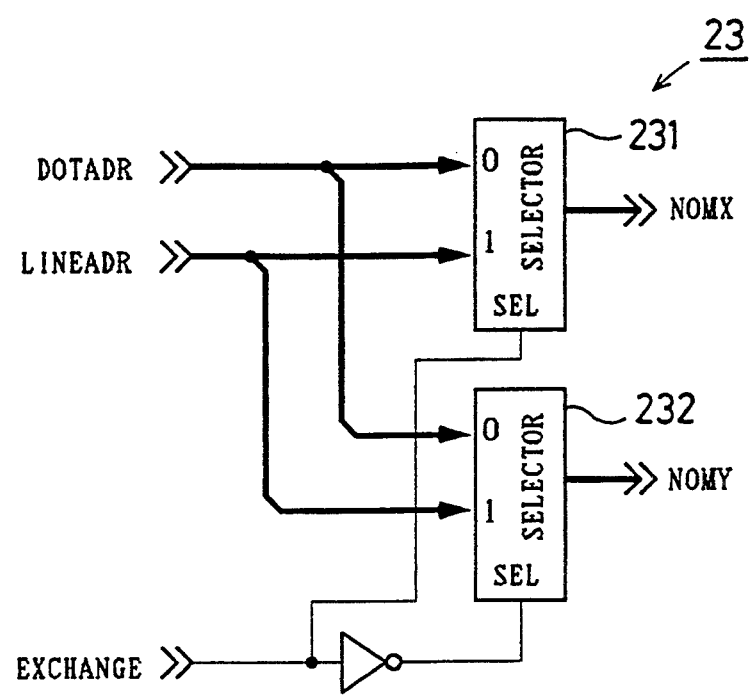
FIG. 34 is a block diagram showing the specific circuit structure of an address exchanging portion.

FIG. 34 is a circuit block diagram showing the specific structure of the address exchanging portion 23. Also in FIG. 34, thin and solid lines denote 1-bit signal lines, and data and/or signal lines having a plurality of bits respectively. The address exchanging portion 23 includes selectors 231 and 232 which are connected in parallel as shown in FIG. 34. A dot address (DOTADR) and a line address (LINEADR) are provided to the selectors 231 and 232, respectively. Then, either of the dot address (DOTADR) and line address (LINEADR) is selected. The selectors 231 and 232 select either of addresses contrary to each other by means of an exchange signal (EXCHANGE). When the exchange signal is at a low level, an output address (NOMX) of the selector 231 is a dot address and an output address (NOMY) of the selector 232 is a line address. When the exchange signal is at a high level, the selection of the selectors 231 and 232 is reversed. Consequently, the output address (NOMX) of the selector 231 is a line address and the output address (NOMY) of the selector 232 is a dot address.

There will be summarized the contents of set signals in the case where the rotation of a matrix is specified. In the case where the matrix is not rotated, up/down switching signals (X. U/D) and (Y. U/D) are set to "low" such that the dot counting portion 21 and the line counting portion 22 (see FIG. 31) perform count-up, and an exchange signal (EXCHANGE) is set to "low" such that the address exchanging portion 23 does not perform address exchange.

In the case where the matrix is rotated by 90 degrees, the up/down switching signal (Y. U/D) is set to "high" such that the line counting portion 22 performs count-down, and the exchange signal is set to "high" such that the address exchanging portion 23 performs address exchange as shown in FIG. 13.

In the case where the matrix is rotated by 180 degrees, the up/down switching signals (X. U/D) and (Y. U/D) are set to "high" such that the dot counting portion 21 and the line counting portion 22 perform count-down, and the exchange signal is set to "low" such that the address exchanging portion 23 does not perform address exchange (see FIG. 14 ).

In the case where the matrix is rotated by 270 degrees, the up/down switching signal (X. U/D) is set to "high" such that the dot counting portion 21 performs count-down, the up/down switching signal (Y. U/D) is set to "low" such that the line counting portion 22 performs count-up, and the exchange signal is set to "high" such that the address exchanging portion 23 performs address exchange as shown in FIG. 15.

Figure 35:
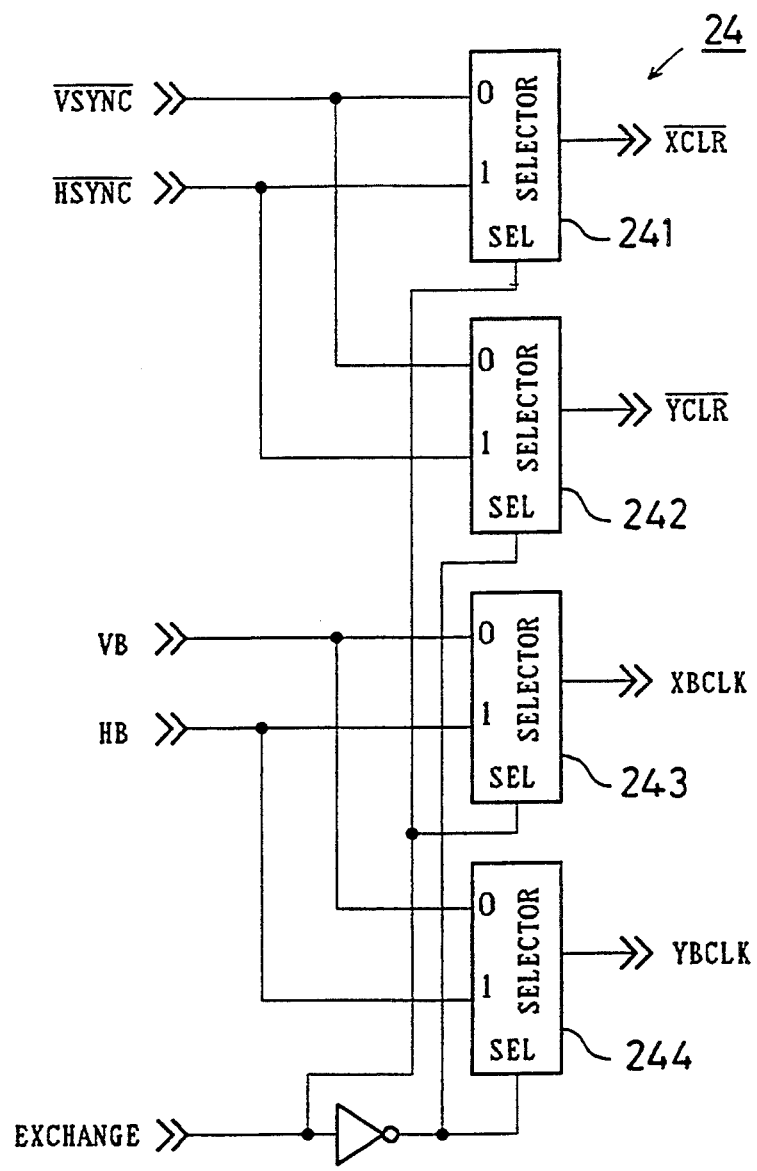
FIG. 35 is a block diagram showing the specific circuit structure of a boundary exchanging portion.

FIG. 35 is a block diagram showing the specific circuit structure of a boundary exchanging portion 24. The boundary exchanging portion 24 includes a pair of selectors 241 and 242 for selecting a vertical synchronous signal (VSYNC inverted signal) and a horizontal synchronous signal (HSYNC inverted signal), and a pair of selectors 243 and 244 for selecting a subscanning direction matrix boundary signal (VB) and a main scanning direction matrix boundary signal (HB), respectively.

The selectors 241, 242, 243 and 244 are interlockingly switched by an exchange signal (EXCHANGE). The selectors 241 and 242 perform selection by the exchange signal contrary to each other. When the exchange signal is set to "low" the selector 241 selects the vertical synchronous signal as an output (an XCLR inverted signal) and the selector 242 selects the horizontal synchronous signal as an output (a YCLR inverted signal). When the exchange signal is set to "high", the selection of the selectors 241 and 242 is reversed. Consequently, the outputs are opposed to each other.

Similarly, when the exchange signal is set to "low", the selector 243 selects the subscanning direction boundary signal (VB) as an output signal XBCLK and the selector 244 selects the main scanning direction boundary signal (HB) as an output signal YBCLK. When the exchange signal is set to "high", the selection of the selectors 243 and 244 is reversed. Consequently, signals outputted from the selectors 243 and 244 are opposed to each other.

Figure 36:
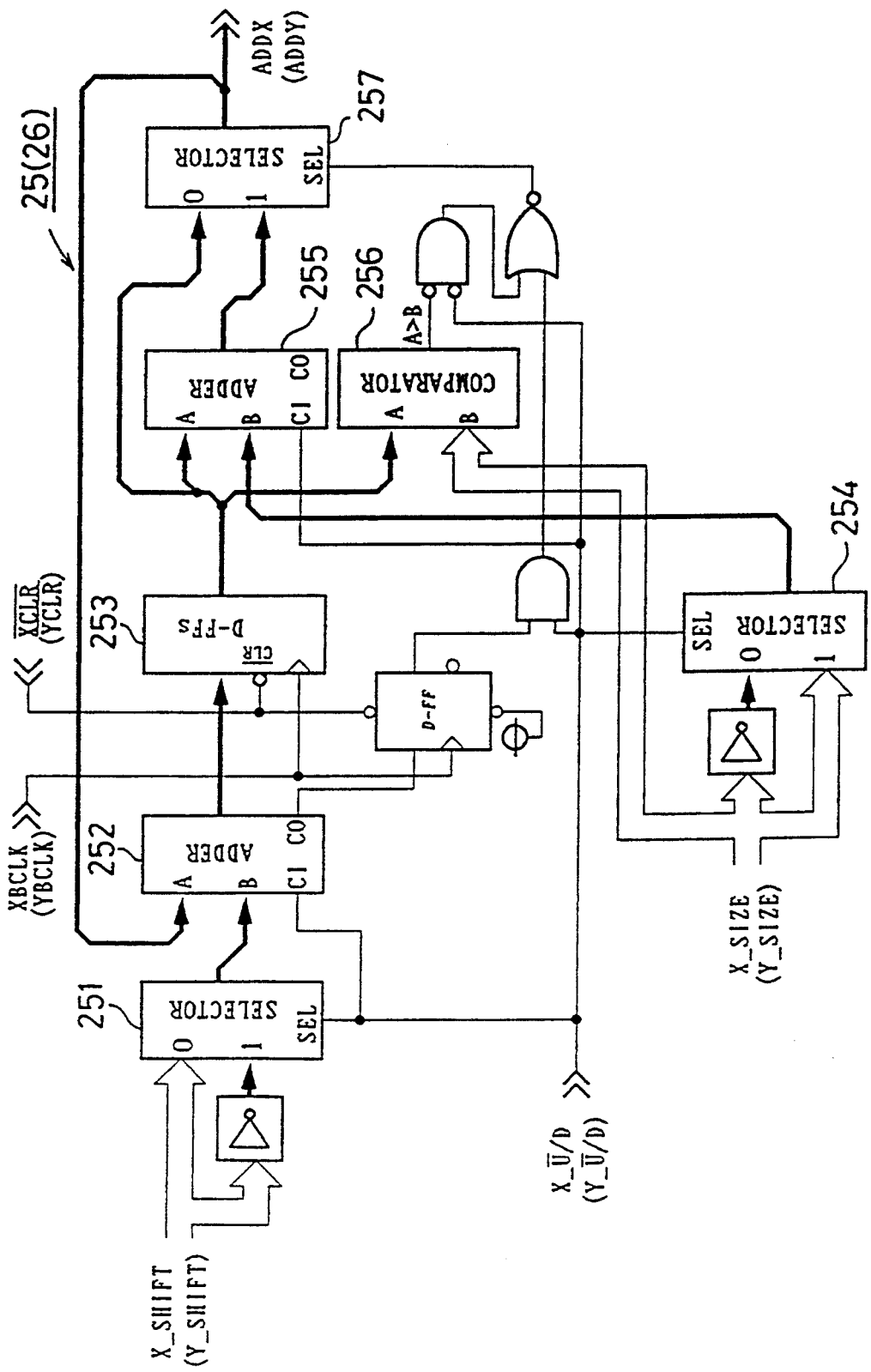
FIG. 36 is a block diagram showing the specific circuit structure of a matrix boundary counting portion.

FIG. 36 is a block diagram showing the specific circuit structure of the matrix boundary counting portions 25 and 26. As apparent from FIG. 36, the matrix boundary counting portions 25 and 26 have the same circuit structure. In the case where the matrix boundary counting portion 25 is operated, signals which are not put in parentheses are provided or outputted. When the matrix boundary counting portion 26 is operated, signals which are put in parentheses are provided or outputted.

The matrix boundary counting portions 25 and 26 are circuits for generating adding addresses so as to sequentially shift the order of reading out memory tables to be used for a dither processing as described above.

There will be described with reference to FIG. 36 the structure and operation of the matrix boundary counting portion 25 for counting main scanning direction matrix boundaries.

The boundary counting portion 25 includes a selector 251, an adder 252, a flip-flop 253, a selector 254, an adder 255, a comparator 256, and a selector 257. The selector 251 serves to select whether the set data (X. SHIFT) for a shifting value in the main scanning direction is outputted as it is or is inverted and outputted. The adder 252 serves to add an adding address (ADDX) and the output of the selector 251 together. The flip-flop 253 serves to hold the output of the adder 252. The selector 254 serves to switch the output of a set main scanning direction matrix size (X. SIZE) (actual matrix size −1) and its inverted output. The adder 255 serves to add the outputs of the flip-flop 253 and selector 254 together. The comparator 256 serves to compare the output of the flip-flop 253 with the main scanning direction matrix size (X. SIZE), and derives an output when the output of the flip-flop 253 is greater than the main scanning direction matrix size (X. SIZE). The selector 257 serves to select the output of the flip-flop 253 or adder 255 as an adding address (ADDX).

Also in this circuit, thin lines denote 1-bit signal lines, solid lines denote data and/or signal lines having a plurality of bits, and a double-line arrow denotes the set data of each parameter in similar to the above-mentioned circuits.

The circuit operation is greatly varied in the cases where an up/down switching signal (X. U/D) is "0" (count-up) and it is "1" (count-down).

There will be described the case where the up/down switching signal (X. U/D) is "0" (count-up).

In that case, data (X. SHIFT) for setting a shifting value in the main scanning direction is outputted from the selector 251 as it is, and then sent to the adder 252. Every time a boundary detecting clock (XBCLK) is sent from the boundary exchanging portion 24 (see FIG. 31), the adder 252 adds together the adding address (ADDX) outputted from the selector 257 and the output of the selector 251. The adding address (ADDX) outputted from the selector 257 is "0" until processing is started.

The flip-flop 253 holds the output of the adder 252, and sends the same to the selector 257, the adder 255 and the comparator 256.

The comparator 256 compares the data provided from the flip-flop 253 with a main scanning direction matrix size (X. SIZE). When the upper limit of data to be treated in view of a circuit is obtained, i.e., the output of the flip-flop 253 is greater than the main scanning direction matrix size (X. SIZE), the adder 255 adds together the output of the flip-flop 253 and the inverted output of the matrix size (X. SIZE)(actual matrix size−1) outputted from the selector 254. In other words, an actual matrix size (X. SIZE+1) is subtracted from the output of the flip-flop 253. In this case, the selector 257 selects the output of the adder 255.

In the case where the up/down switching signal (X. U/D) is "1" (count-down), the set data (X. SHIFT) for the shifting value in the main scanning direction is provided as an inverted negative value to the adder 252. Every time the main scanning direction boundary detecting clock (XBCLK) is provided, the output of the selector 257 is sent to the adder 252. The adder 252 subtracts the set data (X. SHIFT) from the adding address (ADDX).

The output of the adder 252 is held in the flip-flop 253 and sent to the adder 255, the selector 257 and the comparator 256.

Also in the case of the count-down, the data to be treated in view of a circuit has an upper limit. Consequently, the carry output of the adder 252 detects that a value obtained by the adder 252 is a negative number. In this case, the adder 255 adds together a negative value provided from the flip-flop 253 and the matrix size (X. SIZE) outputted from the selector 254. Then, a result thus obtained and "1" are added together by the carry input of the adder 255. More specifically, the negative output of the flip-flop 253 and the actual matrix size (X. SIZE+1) are added together. The selector 257 selects the output of the flip-flop 253 or the adder 255. Consequently, a negative value is not outputted from the selector 257.

According to the above-mentioned operation, addresses from "0" to the main scanning direction matrix size (X. SIZE) are outputted as the adding addresses (ADDX) from the matrix boundary counting portion 25.

Figure 37:
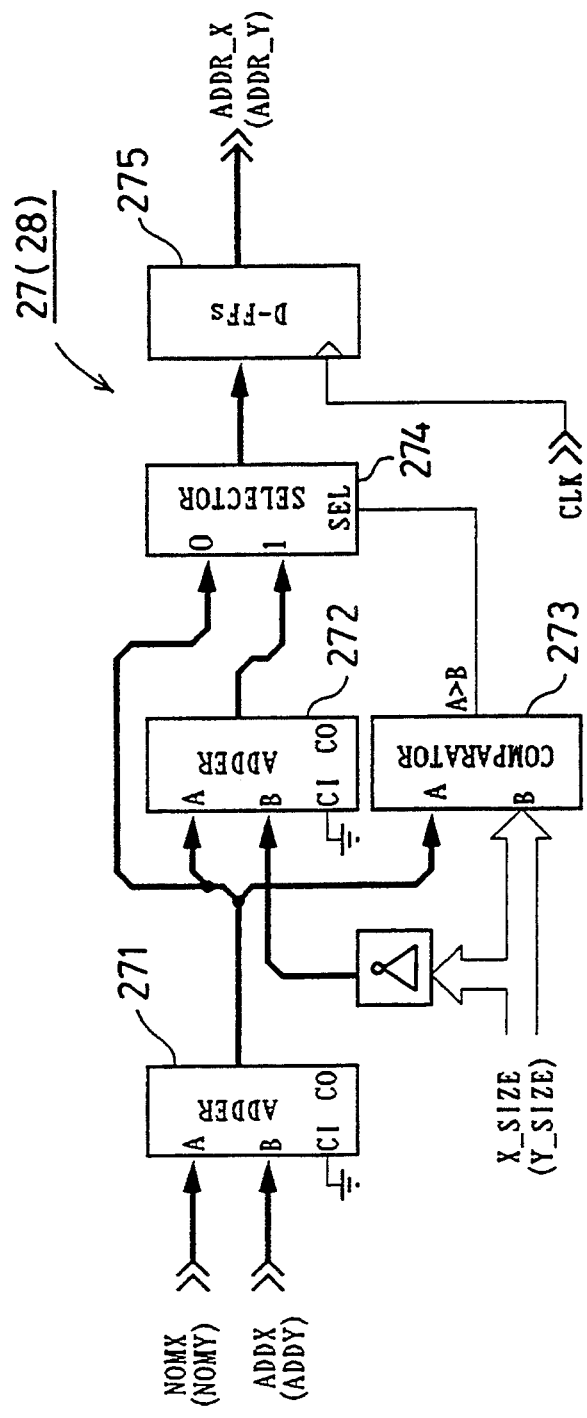
FIG. 37 is a block diagram showing the specific circuit structure of an adding portion.

FIG. 37 is a block diagram showing the specific circuit structure of the adding portions 27 and 28. As apparent from FIG. 37, the adding portions 27 and 28 have the same circuit structure. In the case of the adding portion 27, signals which are not put in parentheses are inputted or outputted. In the case of the adding portion 28, signals which are put in parentheses are inputted or outputted.

Also in this circuit, thin lines denote 1-bit signal lines, solid lines denote data and/or signal lines having a plurality of bits, and an arrow except inside denotes the set data of each parameter in similar to the above-mentioned circuits.

There will be described the circuit structure and operation of the adding portion 27 shown in FIG. 37.

The adding portion 27 serves to add an address generated by the dot counting portion 21 or the line counting portion 22 (see FIG. 31), i.e., an address (NOMX) outputted from the address exchanging portion 23 and an adding address (ADDX) generated by the matrix boundary counting portion 25 together, and to generate a main scanning direction matrix address (ADDR. X).

This circuit includes the adders 271 and 272, a comparator 273, a selector 274, and a flip-flop 275. The adder 271 serves to add an address (NOMX) and an adding address (ADDX) together. The adder 272 serves to add together the output of the adder 271 and the inverted value of matrix size data (X. SIZE). The comparator 273 serves to detect whether the output address of the adder 271 is greater than the matrix size data (X. SIZE). The selector 274 serves to select the output of the adder 271 or that of a result obtained by the adder 272. The flip-flop 275 serves to hold and derive an output in synchronous with a clock (CLK).

In the adding portion 27, the address (NOMX) and the adding address (ADDX) are first added together by the adder 271. A result obtained by the adder 271 is compared with a main scanning direction matrix size (X. SIZE) by the comparator 273. When the result of the adder 271 is greater than the matrix size, an actual matrix size (X. SIZE+1) is subtracted from the result of the adder 271 by the adder 272.

The output of the adder 271 or 272 is selected by the selector 274. The selected output is not greater than the matrix size. Finally, a matrix address (ADDR. X) is outputted from the flip-flop 275 in synchronism with the clock (CLK).

Figure 38:
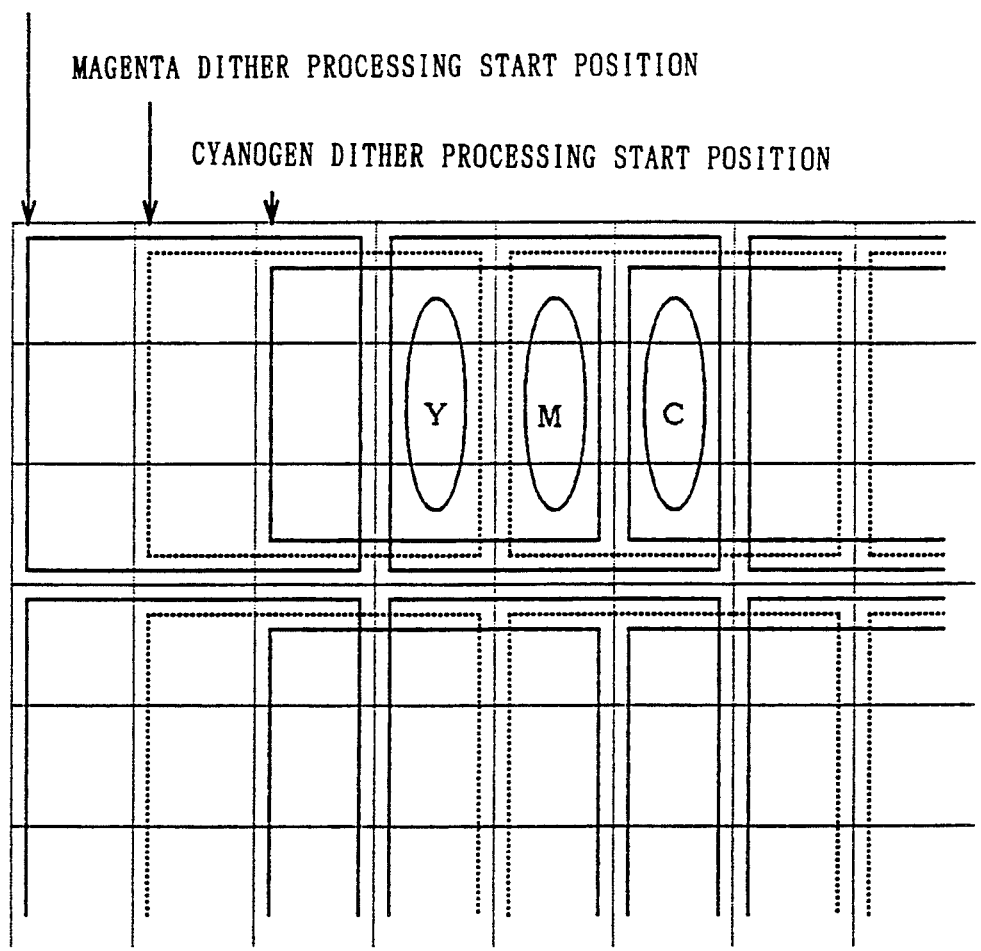
FIG. 38 is a diagram for explaining the case where the processing start position of each color component is varied at the time of a color image processing.

According to the device of the present embodiment, in the case where color image data is processed, a processing start position can be delayed, for example, by desired pixels in a main scanning direction. Consequently, the dither processing start positions of yellow data, magenta data and cyanogen data can be varied for each color data at the time of a color image data processing. As shown in FIG. 38, the dither processing start positions of yellow data, magenta data and cyanogen data can be shifted by 1 pixel in the main scanning direction respectively. Thus, if the dither processing start position is shifted for each color data, there can be obtained half-tone images of which color is rich in variety and natural gradation.

The matrix address generator according to the present invention is not limited to the above-mentioned embodiment having a specific hardware structure. Various changes can be made without departing from the scope of the invention.

Figure 39:
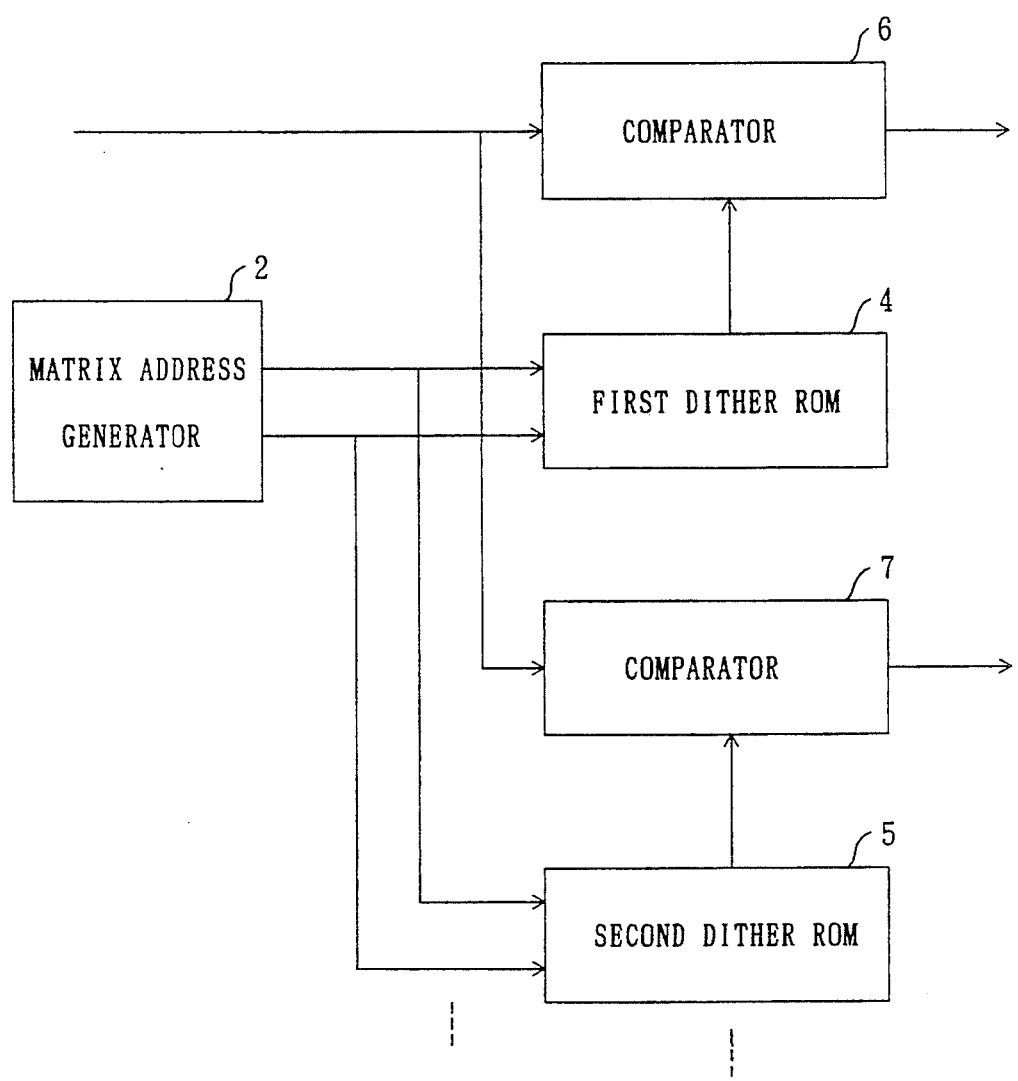
FIG. 39 is a schematic diagram showing another example in which the matrix address generator according to the embodiment of the present invention is used.

By way of example, the matrix address generator according to the present invention cannot only generate horizontal and vertical addresses for specifying the memory table of the gradation data storage means 1 shown in FIG. 1 but can be used as shown in FIG. 39. More specifically, the matrix address generator may have a structure in which the address(es) of one of or a plurality of dither threshold matrix memories 4, 5, ... is(are) specified and the threshold of the specified address is compared with input data at the time of a dither processing.

Furthermore, the matrix address generator according to the present invention can be utilized for not only a multivalue dither processing but a binary dither processing.

Although the present invention has fully been described by way of example with reference to the accompanying drawings, it is to be understood that various changes and modifications will be apparent to those skilled in the art. Therefore, unless otherwise such changes and modifications depart from the scope of the invention, they should be construed as being included therein.

What is claimed is:

1. A matrix address generator for generating X and Y addresses, comprising;
    dot counting means for repeatedly counting X pulses to be provided within a first counted value range which is predetermined,
    line counting means for repeatedly counting Y pulses to be provided within a second counted value range which is predetermined, and outputting counted values as Y addresses,
    X shift address counting means for repeatedly counting within a predetermined counted value range, shift addresses which shift X addresses, and
    adding means for adding together values counted by the dot counting means and values counted by the X shift address counting means in synchronism with the X pulses, and outputting addition values as the X addresses.

2. The matrix address generator according to claim 1, wherein the dot counting means includes start timing shift means for delaying a counting start operation until a predetermined number of X pulses have been provided.

3. A matrix address generator for generating X and Y addresses, comprising;
    dot counting means for repeatedly counting X pulses to be provided within a first counted value range which is predetermined, and outputting counted values as X addresses,
    line counting means for repeatedly counting Y pulses to be provided within a second counted value range which is predetermined,
    Y shift address counting means for repeatedly counting within a predetermined counted value range, shift addresses which shift Y addresses, and
    adding means for adding together values counted by the line counting means and values counted by the Y shift address counting means in synchronism with the X pulses, and outputting addition values as the Y addresses.

4. The matrix address generator according to claim 3, wherein the line counting means includes start timing shift means for delaying a counting start operation until a predetermined number of Y pulses have been provided.

5. A matrix address generator for generating X and Y addresses, comprising;
    dot counting means for repeatedly counting X pulses to be provided within a first counted value range which is predetermined,
    line counting means for repeatedly counting Y pulses to be provided within a second counted value range which is predetermined,
    X shift address counting means for repeatedly counting within a predetermined counted value range, shift addresses which shift X addresses,
    Y shift address counting means for repeatedly counting within a predetermined counted value range, shift addresses which shift Y addresses,
    selecting means for selectively operating the X or Y shift address counting means,
    X address adding means for adding together values counted by the X shift address counting means and values counted by the dot counting means in synchronism with the X pulses when the X shift address counting means is selected by the selecting means, and outputting addition values as the X addresses, and
    Y address adding means for adding together values counted by the Y shift address counting means and values counted by the line counting means in synchronous with the X pulses when the Y shift address counting means is selected by the selecting means, and outputting addition values as the Y addresses.

6. The matrix address generator according to claim 5, wherein the dot counting means includes start timing shift means for delaying a counting start operation until a predetermined number of X pulses have been provided.

7. The matrix address generator according to claim 5, wherein the line counting means includes start timing shift means for delaying, counting start operation until a predetermined number of Y pulses have been provided.

8. A matrix address generator for generating X and Y addresses, comprising;
    dot counting means for repeatedly counting X pulses to be provided within a first counted value range which is predetermined, and outputting counted values as X addresses,
    line counting means for repeatedly counting Y pulses to be provided within a second counted value range which is predetermined, and outputting counted values as Y addresses, and
    dot counting start timing shift means for delaying the counting start operation of the dot counting means until a-predetermined number of X pulses have been provided.

9. A matrix address generator for generating X and Y addresses, comprising;
    dot counting means for repeatedly counting X pulses to be provided within a first counted value range which is predetermined, and outputting counted values as X addresses,
    line counting means for repeatedly counting Y pulses to be provided within a second counted value range which is predetermined, and outputting counted values as Y addresses, and
    line counting start timing shift means for delaying the counting start operation of the line counting means until a predetermined number of Y pulses have been provided.

10. A matrix address generator for generating X and Y addresses, comprising:

dot counting means for repeatedly counting X pulses to be provided within a first counted value range which is predetermined, line counting means for repeatedly counting Y pulses to be provided within a second counted value range which is predetermined, address exchanging means for exchanging values counted by the dot counting means for values counted by the line counting means and outputting the same, X address outputting means for outputting as X addresses the counted values of the line counting means which are processed by the address exchanging means, and Y address outputting means for outputting as Y addresses the counted values of the dot counting means which are processed by the address exchanging means.

11. The matrix address generator according to claim 10, wherein the dot counting means serves to perform count-up and the line counting means serves to perform count-down.

12. The matrix address generator according to claim 10, wherein the dot counting means serves to perform count-down and the line counting means serves to perform count-up.

13. The matrix address generator according to claim 10, wherein the address exchanging means includes exchange switching means for selectively exchanging and outputting the counted values of the dot counting means and the line counting means.

14. A matrix address generator for generating X and Y addresses, comprising;

dot counting means for repeatedly counting X pulses to be provided within a first counted value range which is predetermined, line counting means for repeatedly counting Y pulses to be provided within a second counted value range which is predetermined, X shift address counting means for repeatedly counting shift addresses which shift X addresses, boundary signal outputting means for detecting when the dot counting means repeatedly performs counting within the first counted value range and the line counting means repeatedly performs counting within the second counted value range, and for sending a signal indicative of either repeat counting by the dot and line counting means as a counting repeat timing signal to the X shift address counting means, address exchanging means for exchanging values counted by the dot counting means for values counted by the line counting means and outputting the same, Y address outputting means for outputting as Y addresses, the counted values of the dot counting means which are processed by the address exchanging means, pre-X address outputting means for outputting as pre-X addresses, the counted values of the line counting means which are processed by the address exchanging means, and adding means for adding together values counted by the pre-K address outputting means and values counted by the X shift address counting means in synchronism with the X pulses, and outputting addition values as the X addresses.

15. The matrix address generator according to claim 14, wherein the address exchanging means includes exchange switching means for selectively exchanging and outputting the counted values of the dot counting means and the line counting means.

16. The matrix address generator according to claim 15, wherein the boundary signal outputting means can switch the state in which the repeat counting occurrence of the dot counting means is provided to the X shift address counting means and the repeat counting occurrence of the line counting means is provided to the Y shift address counting means, and the state in which the repeat counting occurrence of the dot counting means is provided to the Y shift address counting means and the repeat counting occurrence of the line counting means is provided to the X shift address counting means, and wherein the boundary signal outputting means and exchange switching means perform switching based on the same switching signal.

17. A matrix address generator for generating X and Y addresses, comprising:

dot counting means for repeatedly counting X pulses to be provided within a first counted value range which is predetermined, line counting means for repeatedly counting Y pulses to be provided within a second counted value range which is predetermined, Y shift address counting means for repeatedly counting shift addresses which shift Y addresses, boundary signal outputting means for detecting when the dot counting means repeatedly performs counting within the first counted value range and the line counting means repeatedly performs counting within the second counting value range, and for sending a signal indicative of either repeat counting by the dot and line counting means as a counting repeat timing signal to the Y shift address counting means, address exchanging means for exchanging values counted by the dot counting means for values counted by the line counting means and outputting the same, X address outputting means for outputting as X addresses, the counted values of the line counting means which are processed by the address exchanging means, pre-Y address outputting means for outputting as pre-Y addresses, the counted values of the dot counting means which are processed by the address exchanging means, and adding means for adding together values counted by the pre-Y address outputting means and values counted by the Y shift address counting means in synchronism with the X pulses, and outputting addition values as the Y addresses.

18. The matrix address generator according to claim 17, wherein the address exchanging means includes exchange switching means for selectively exchanging and outputting the counted values of the dot counting means and the line counting means.

19. The matrix address generator according to claim 18, wherein the boundary signal outputting means can switch the state in which the repeat counting occurrence of the dot counting means is provided to the X shift address counting means and the repeat counting occurrence of the line counting means is provided to the Y shift address counting means, and the state in which the repeat counting occurrence of the dot counting means is provided to the Y shift address counting means and the repeat counting occurrence of the line counting means is provided to the X shift address counting means, and wherein the boundary signal outputting means and exchange switching means perform switching based on the same switching signal.

20. A matrix address generator for generating X and Y addresses, comprising;

dot counting means for repeatedly counting X pulses to be provided within a first counted value range which is predetermined, line counting means for repeatedly counting Y pulses to be provided within a second counted value range which is predetermined, X shift address counting means for repeatedly counting shift addresses which shift X addresses, Y shift address counting means for repeatedly counting shift addresses which shift Y addresses, boundary signal outputting means for detecting when the dot counting means repeatedly performs counting within the first counted value range and the line counting means repeatedly performs counting within the second counted value range, for sending a signal indicative of one of the repeat countings by the dot and line counting means as a counting repeat timing signal to the X shift address counting means, and sending a signal indicative of the other of the repeat countings as a counting repeat timing signal to the Y shift address counting means, address exchanging means for exchanging values counted by the dot counting means for values counted by the line counting means and outputting the same, pre-X address outputting means for outputting as pre-X addresses, the counted values of the line counting means which are processed by the address exchanging means, pre-Y address outputting means for outputting as pre-Y addresses, the counted values of the dot counting means which are processed by the address exchanging means, selecting means for selectively operating the X or Y shift address counting means, X address adding means for adding together values counted by the X shift address counting means and values counted by the pre-X address outputting means in synchronism with the X pulses when the X shift address counting means is selected by the selecting means, and outputting addition values as the X addresses, and Y address adding means for adding together values counted by the Y shift address counting means and values counted by the pre-Y address outputting means in synchronism with the X pulses when the Y shift address counting means is selected by the selecting means, and outputting addition values as the Y addresses.

21. The matrix address generator according to claim 20, wherein the address exchanging means includes exchange switching means for selectively exchanging and outputting the counted values of the dot counting means and the line counting means.

22. The matrix address generator according to claim 21, wherein the boundary signal outputting means can switch the state in which the repeat counting occurrence of the dot counting means is provided to the X shift address counting means and the repeat counting occurrence of the line counting means is provided to the Y shift address counting means, and the state in which the repeat counting occurrence of the dot counting means is provided to the Y shift address counting means and the repeat counting occurrence of the line counting means is provided to the X shift address counting means, and wherein the boundary signal outputting means and exchange switching means perform switching based on the same switching signal.

* * * * *